United States Patent
Talpey et al.

(10) Patent No.: US 10,284,626 B2
(45) Date of Patent: *May 7, 2019

(54) TRANSPORTING OPERATIONS OF ARBITRARY SIZE OVER REMOTE DIRECT MEMORY ACCESS

(71) Applicant: Microsoft Technology Licensing, LLC, Redmond, WA (US)

(72) Inventors: Thomas M. Talpey, Stow, MA (US); Gregory Robert Kramer, Bothell, WA (US); David Matthew Kruse, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/094,753

(22) Filed: Apr. 8, 2016

(65) Prior Publication Data
US 2016/0226951 A1    Aug. 4, 2016

Related U.S. Application Data

(63) Continuation of application No. 13/172,757, filed on Jun. 29, 2011, now Pat. No. 9,331,955.

(51) Int. Cl.
*G06F 15/167* (2006.01)
*H04L 29/08* (2006.01)
(Continued)

(52) U.S. Cl.
CPC ............. *H04L 67/06* (2013.01); *G06F 3/061* (2013.01); *G06F 3/067* (2013.01); *G06F 3/0656* (2013.01);
(Continued)

(58) Field of Classification Search
CPC ....... H04L 67/06; H04L 1/1835; H04L 47/39; H04L 47/722; H04L 49/9057;
(Continued)

(56) References Cited

U.S. PATENT DOCUMENTS

| | | |
|---|---|---|
| 4,399,504 A | 8/1983 | Obermarck |
| 4,780,821 A | 10/1988 | Crossley |

(Continued)

FOREIGN PATENT DOCUMENTS

| | | |
|---|---|---|
| CN | 1155119 A | 7/1997 |
| CN | 1299484 A | 6/2001 |

(Continued)

OTHER PUBLICATIONS

Aboba et. al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.

(Continued)

*Primary Examiner* — Frantz B Jean

(57) ABSTRACT

The embodiments described herein generally relate to a protocol for implementing data operations, e.g., a version of SMB, atop RDMA transports. In embodiments, systems and methods use the protocol definition, which specifies new messages for negotiating an RDMA connection and for transferring SMB2 data using the negotiated communication. A new protocol message may include new header information to determine message size, number of messages, and other information for sending the SMB2 data over RDMA. The header information is used to accommodate differences in message size requirements between RDMA and SMB2. The SMB Direct protocol allows SMB2 data to be fragmented into multiple individual RDMA messages that a receiver may then logically concatenate into a single SMB2 request or SMB2 response. The SMB Direct protocol (Continued)

also may allow SMB2 to transfer application data via efficient RDMA direct placement and to signal the application data's availability when the transfer is complete.

20 Claims, 16 Drawing Sheets

(51) Int. Cl.
- *H04L 12/861* (2013.01)
- *H04L 1/18* (2006.01)
- *H04L 12/801* (2013.01)
- *H04L 12/925* (2013.01)
- *G06F 17/30* (2006.01)
- *G06F 3/06* (2006.01)

(52) U.S. Cl.
CPC ...... *G06F 17/30203* (2013.01); *H04L 1/1835* (2013.01); *H04L 47/39* (2013.01); *H04L 47/722* (2013.01); *H04L 49/9057* (2013.01); *H04L 67/1097* (2013.01)

(58) Field of Classification Search
CPC ... H04L 67/1097; G06F 3/061; G06F 3/0656; G06F 3/067; G06F 17/30203
USPC ......................................................... 709/212
See application file for complete search history.

(56) References Cited

U.S. PATENT DOCUMENTS

| | | |
|---|---|---|
| 4,791,566 A | 12/1988 | Sudama |
| 4,825,354 A | 4/1989 | Agrawal |
| 4,887,204 A | 12/1989 | Johnson |
| 4,891,785 A | 1/1990 | Donohoo |
| 4,914,570 A | 4/1990 | Peacock |
| 5,008,853 A | 4/1991 | Bly |
| 5,109,519 A | 4/1992 | Zimmet |
| 5,113,519 A | 5/1992 | Johnson |
| 5,202,971 A | 4/1993 | Henson |
| 5,218,696 A | 6/1993 | Baird et al. |
| 5,261,051 A | 11/1993 | Masden et al. |
| 5,265,261 A | 11/1993 | Rubin et al. |
| 5,313,646 A | 5/1994 | Hendricks et al. |
| 5,349,642 A | 9/1994 | Kingdon |
| 5,375,207 A | 12/1994 | Blakely et al. |
| 5,410,697 A | 4/1995 | Baird |
| 5,437,013 A | 7/1995 | Rubin et al. |
| 5,452,447 A | 9/1995 | Nelson |
| 5,491,752 A | 2/1996 | Kaufman et al. |
| 5,493,728 A | 2/1996 | Solton |
| 5,513,314 A | 4/1996 | Kandasamy |
| 5,522,042 A | 5/1996 | Fee et al. |
| 5,535,375 A | 7/1996 | Eshel et al. |
| 5,560,008 A | 9/1996 | Johnson et al. |
| 5,583,117 A | 12/1996 | Karp et al. |
| 5,628,005 A | 5/1997 | Hurvig |
| 5,764,887 A | 6/1998 | Kells et al. |
| 5,826,027 A | 10/1998 | Pedersen et al. |
| 5,931,913 A | 8/1999 | Meriwether et al. |
| 5,933,602 A | 8/1999 | Grover |
| 5,978,802 A | 11/1999 | Hurvig |
| 5,987,621 A | 11/1999 | Duso et al. |
| 6,085,247 A | 7/2000 | Parsons et al. |
| 6,092,199 A | 7/2000 | Dutcher |
| 6,125,122 A | 9/2000 | Favichia et al. |
| 6,131,125 A | 10/2000 | Rostoker et al. |
| 6,208,952 B1 | 3/2001 | Goertzel |
| 6,219,799 B1 | 4/2001 | Kandasamy |
| 6,243,862 B1 | 6/2001 | Lebow |
| 6,247,139 B1 | 6/2001 | Walker et al. |
| 6,275,953 B1 | 8/2001 | Vahalia et al. |
| 6,317,844 B1 | 11/2001 | Kleiman |
| 6,324,581 B1 | 11/2001 | Xu et al. |
| 6,347,337 B1* | 2/2002 | Shah ...................... H04L 47/10 709/224 |
| 6,349,250 B1 | 2/2002 | Hart et al. |
| 6,349,350 B1 | 2/2002 | Hathorn et al. |
| 6,401,123 B1 | 6/2002 | Shields et al. |
| 6,430,691 B1 | 8/2002 | Di Santo et al. |
| 6,438,691 B1 | 8/2002 | Mao |
| 6,452,903 B1 | 9/2002 | Peck et al. |
| 6,453,354 B1 | 9/2002 | Jiang et al. |
| 6,640,226 B1 | 10/2003 | Shringeri et al. |
| 6,658,476 B1 | 12/2003 | Van |
| 6,732,289 B1 | 5/2004 | Talagala et al. |
| 6,829,473 B2 | 12/2004 | Raman et al. |
| 6,883,015 B1 | 4/2005 | Geen et al. |
| 6,910,082 B1 | 6/2005 | Marcotte |
| 6,928,577 B2 | 8/2005 | Moser et al. |
| 7,020,651 B2 | 3/2006 | Ripley |
| 7,050,984 B1 | 5/2006 | Kerpelman |
| 7,103,007 B2 | 9/2006 | Natarajan et al. |
| 7,111,035 B2 | 9/2006 | McClellan et al. |
| 7,111,060 B2 | 9/2006 | Araujo et al. |
| 7,197,535 B2 | 3/2007 | Salesky et al. |
| 7,243,132 B2 | 7/2007 | Choi |
| 7,290,141 B2 | 10/2007 | Sengodan et al. |
| 7,293,192 B2 | 11/2007 | Allen et al. |
| 7,318,102 B1 | 1/2008 | Krause et al. |
| 7,330,910 B2 | 2/2008 | Young et al. |
| 7,339,885 B2 | 3/2008 | Ahrens et al. |
| 7,380,080 B2 | 5/2008 | Hughes |
| 7,380,155 B2 | 5/2008 | Fung et al. |
| 7,383,463 B2 | 6/2008 | Hayden et al. |
| 7,386,889 B2 | 6/2008 | Shay |
| 7,388,866 B2 | 6/2008 | Fan et al. |
| 7,409,420 B2 | 8/2008 | Pullara et al. |
| 7,421,502 B2 | 9/2008 | Czap et al. |
| 7,434,087 B1 | 10/2008 | Singh |
| 7,444,536 B1 | 10/2008 | Jairath |
| 7,451,221 B2 | 11/2008 | Basani et al. |
| 7,453,879 B1 | 11/2008 | Lo |
| 7,457,722 B1 | 11/2008 | Shain et al. |
| 7,475,142 B2 | 1/2009 | Sharma et al. |
| 7,509,407 B2 | 3/2009 | Miller et al. |
| 7,526,658 B1 | 4/2009 | He et al. |
| 7,526,668 B2 | 4/2009 | Shitomi et al. |
| 7,539,722 B2 | 5/2009 | Mohamed et al. |
| 7,562,129 B1 | 7/2009 | Lee et al. |
| 7,664,991 B1 | 2/2010 | Gunda et al. |
| 7,673,066 B2 | 3/2010 | Zheng |
| 7,702,745 B2 | 4/2010 | Lin et al. |
| 7,730,489 B1 | 6/2010 | Duvur et al. |
| 7,774,544 B1 | 8/2010 | Watanabe et al. |
| 7,962,129 B2 | 6/2011 | Small et al. |
| 8,275,815 B2 | 9/2012 | Aronovich et al. |
| 8,316,129 B2 | 11/2012 | Kruse et al. |
| 8,332,526 B2 | 12/2012 | Kruse et al. |
| 8,631,277 B2 | 1/2014 | Swan et al. |
| 8,788,579 B2 | 7/2014 | Kruse et al. |
| 8,825,885 B2 | 9/2014 | Kruse et al. |
| 8,850,025 B2 | 9/2014 | Kruse et al. |
| 8,856,582 B2 | 10/2014 | George et al. |
| 9,071,661 B2 | 6/2015 | Kruse et al. |
| 9,332,089 B2 | 5/2016 | Kruse et al. |
| 9,438,696 B2 | 9/2016 | Kruse et al. |
| 9,462,039 B2 | 10/2016 | George et al. |
| 2002/0019874 A1 | 2/2002 | Borr |
| 2002/0024963 A1* | 2/2002 | Reeve ...................... H04L 49/90 370/412 |
| 2002/0062379 A1 | 5/2002 | Widegren |
| 2002/0073211 A1 | 6/2002 | Lin et al. |
| 2002/0083130 A1 | 6/2002 | Shimada et al. |
| 2002/0152315 A1 | 10/2002 | Kagan et al. |
| 2002/0161980 A1 | 10/2002 | Nishikawa |
| 2003/0014480 A1 | 1/2003 | Pullara et al. |
| 2003/0018927 A1 | 1/2003 | Gadir et al. |
| 2003/0056069 A1 | 3/2003 | Cabrera et al. |
| 2003/0058277 A1 | 3/2003 | Bowman-Amuah |
| 2003/0093643 A1 | 5/2003 | Britt, Jr. |
| 2003/0093678 A1 | 5/2003 | Bowe et al. |
| 2003/0112754 A1 | 6/2003 | Ramani et al. |

(56) References Cited

U.S. PATENT DOCUMENTS

| | | |
|---|---|---|
| 2003/0115341 A1 | 6/2003 | Sinha et al. |
| 2003/0126195 A1 | 7/2003 | Reynolds et al. |
| 2003/0140129 A1 | 7/2003 | Livnat et al. |
| 2003/0169859 A1 | 9/2003 | Strathmeyer et al. |
| 2003/0182282 A1 | 9/2003 | Ripley |
| 2004/0003210 A1 | 1/2004 | Duale et al. |
| 2004/0003241 A1 | 1/2004 | Sengodan et al. |
| 2004/0018829 A1 | 1/2004 | Raman et al. |
| 2004/0019660 A1 | 1/2004 | E. et al. |
| 2004/0032876 A1 | 2/2004 | Garg et al. |
| 2004/0044930 A1 | 3/2004 | Keller et al. |
| 2004/0103342 A1 | 5/2004 | Moser et al. |
| 2004/0111527 A1 | 6/2004 | Czap, Jr. et al. |
| 2004/0136325 A1 | 7/2004 | Dobric et al. |
| 2004/0160909 A1 | 8/2004 | Sheynblat |
| 2004/0215794 A1 | 10/2004 | Lauer |
| 2004/0225952 A1 | 11/2004 | Brown et al. |
| 2004/0255202 A1 | 12/2004 | Wong |
| 2004/0260748 A1 | 12/2004 | Springer et al. |
| 2004/0267932 A1 | 12/2004 | Voellm et al. |
| 2004/0267935 A1 | 12/2004 | Patiejunas |
| 2004/0268118 A1 | 12/2004 | Bazan Bejarano |
| 2005/0010670 A1 | 1/2005 | Greschler et al. |
| 2005/0015511 A1 | 1/2005 | Izmailov et al. |
| 2005/0015747 A1 | 1/2005 | Zatloukal et al. |
| 2005/0021832 A1 | 1/2005 | Bennett et al. |
| 2005/0038828 A1 | 2/2005 | Kaluskar et al. |
| 2005/0041686 A1 | 2/2005 | Roy et al. |
| 2005/0055345 A1 | 3/2005 | Ripley |
| 2005/0060442 A1 | 3/2005 | Beverly et al. |
| 2005/0091212 A1 | 4/2005 | Mohamed et al. |
| 2005/0102537 A1 | 5/2005 | Zheng |
| 2005/0111030 A1 | 5/2005 | Berkema et al. |
| 2005/0114670 A1 | 5/2005 | Bowe et al. |
| 2005/0125378 A1 | 6/2005 | Kawada |
| 2005/0129045 A1 | 6/2005 | Machulsky et al. |
| 2005/0131832 A1 | 6/2005 | Fransdonk |
| 2005/0132077 A1 | 6/2005 | Biran et al. |
| 2005/0138528 A1 | 6/2005 | Ameigeiras et al. |
| 2005/0149817 A1 | 7/2005 | Biran et al. |
| 2005/0177635 A1 | 8/2005 | Schmidt et al. |
| 2005/0182850 A1 | 8/2005 | Kohno |
| 2005/0198113 A1 | 9/2005 | Mohamed et al. |
| 2005/0198247 A1 | 9/2005 | Perry et al. |
| 2005/0198359 A1 | 9/2005 | Basani et al. |
| 2005/0198380 A1 | 9/2005 | Panasyuk et al. |
| 2005/0223014 A1 | 10/2005 | Sharma et al. |
| 2005/0228884 A1 | 10/2005 | Hawley |
| 2005/0246803 A1 | 11/2005 | Spencer |
| 2005/0248803 A1 | 11/2005 | Ohara |
| 2005/0251448 A1 | 11/2005 | Gropper |
| 2005/0257022 A1 | 11/2005 | Hughes |
| 2005/0258022 A1 | 11/2005 | Horton et al. |
| 2005/0262084 A1 | 11/2005 | Tomita |
| 2005/0262103 A1 | 11/2005 | Stakutis et al. |
| 2005/0273592 A1 | 12/2005 | Pryor |
| 2006/0031519 A1 | 2/2006 | Helliwell et al. |
| 2006/0036744 A1 | 2/2006 | Andrus et al. |
| 2006/0041698 A1 | 2/2006 | Han et al. |
| 2006/0045005 A1 | 3/2006 | Blackmore et al. |
| 2006/0047818 A1 | 3/2006 | Kruglick et al. |
| 2006/0059118 A1 | 3/2006 | Byrd et al. |
| 2006/0080443 A1 | 4/2006 | Kruglick et al. |
| 2006/0080568 A1 | 4/2006 | Subbararnan et al. |
| 2006/0085328 A1 | 4/2006 | Cohen et al. |
| 2006/0095382 A1 | 5/2006 | Mahlbacher |
| 2006/0130107 A1 | 6/2006 | Gonder et al. |
| 2006/0168262 A1 | 7/2006 | Frazer |
| 2006/0206705 A1 | 9/2006 | Khosravi |
| 2006/0271679 A1 | 11/2006 | Mousseau et al. |
| 2006/0271692 A1 | 11/2006 | Kruse et al. |
| 2006/0271697 A1* | 11/2006 | Kruse ............... H04L 29/08072 709/230 |
| 2006/0281525 A1 | 12/2006 | Borissov |
| 2007/0150558 A1 | 6/2007 | Teodosiu et al. |
| 2007/0150602 A1 | 6/2007 | Yared et al. |
| 2007/0171793 A1 | 7/2007 | Mesut et al. |
| 2007/0192326 A1 | 8/2007 | Angal et al. |
| 2007/0220155 A1 | 9/2007 | Nalla et al. |
| 2008/0010485 A1 | 1/2008 | Shitorni et al. |
| 2008/0126704 A1 | 5/2008 | Ulrich et al. |
| 2008/0151885 A1 | 6/2008 | Horn et al. |
| 2008/0172397 A1 | 7/2008 | Maeda et al. |
| 2008/0256231 A1 | 10/2008 | Burnett et al. |
| 2008/0301311 A1* | 12/2008 | Bestler ............... H04L 69/16 709/230 |
| 2009/0030986 A1 | 1/2009 | Bates |
| 2009/0077097 A1 | 3/2009 | Lacapra et al. |
| 2009/0113050 A1 | 4/2009 | Hatanaka |
| 2009/0138615 A1 | 5/2009 | Cristallo et al. |
| 2009/0172085 A1 | 7/2009 | Arthursson |
| 2009/0183005 A1* | 7/2009 | Kawell, Jr. ............... G06F 21/10 713/171 |
| 2009/0222582 A1 | 9/2009 | Josefsberg et al. |
| 2009/0319661 A1 | 12/2009 | Shiozawa et al. |
| 2009/0327798 A1 | 12/2009 | D'Amato et al. |
| 2010/0042715 A1 | 2/2010 | Tham et al. |
| 2010/0161855 A1 | 6/2010 | Mohamed et al. |
| 2010/0185704 A1 | 7/2010 | George et al. |
| 2011/0040826 A1 | 2/2011 | Chadzelek et al. |
| 2011/0131334 A1 | 6/2011 | Takasu |
| 2012/0144019 A1 | 6/2012 | Zhu et al. |
| 2012/0151249 A1 | 6/2012 | Swan et al. |
| 2013/0007180 A1 | 1/2013 | Talpey et al. |
| 2013/0007518 A1 | 1/2013 | George et al. |
| 2013/0066941 A1 | 3/2013 | Kruse et al. |
| 2013/0067095 A1 | 3/2013 | Kruse et al. |
| 2013/0091199 A1 | 4/2013 | Kruse et al. |
| 2013/0097211 A1 | 4/2013 | Kruse et al. |
| 2013/0228732 A1 | 9/2013 | Robinson et al. |
| 2013/0304932 A1 | 11/2013 | Kruse et al. |
| 2014/0304409 A1 | 10/2014 | Kamath et al. |
| 2014/0372521 A1 | 12/2014 | George et al. |
| 2015/0026248 A1 | 1/2015 | Kruse et al. |
| 2015/0281404 A1 | 10/2015 | Kruse et al. |
| 2015/0365482 A1 | 12/2015 | Kruse et al. |

FOREIGN PATENT DOCUMENTS

| | | |
|---|---|---|
| CN | 1758608 A | 4/2006 |
| CN | 1767472 A | 5/2006 |
| CN | 1870642 A | 11/2006 |
| CN | 1882933 | 12/2006 |
| CN | 1906593 A | 1/2007 |
| CN | 1937532 A | 3/2007 |
| CN | 101207635 A | 6/2008 |
| CN | 101217483 A | 7/2008 |
| CN | 101375263 A | 2/2009 |
| CN | 101535978 A | 9/2009 |
| CN | 101594320 | 12/2009 |
| CN | 101605194 A | 12/2009 |
| CN | 101926155 | 12/2010 |
| EP | 1 259 045 A2 | 11/2002 |
| EP | 1 259 045 A3 | 11/2002 |
| EP | 1643406 A2 | 4/2006 |
| EP | 1669850 | 6/2006 |
| EP | 1 727 056 | 11/2006 |
| EP | 2727287 | 5/2014 |
| JP | 60-019341 | 1/1985 |
| JP | 62-297927 | 12/1987 |
| JP | 63-061148 | 3/1988 |
| JP | 63-205747 | 8/1988 |
| JP | 63-256165 | 10/1988 |
| JP | 64-061148 | 3/1989 |
| JP | 02-101847 | 4/1990 |
| JP | 03-048558 | 3/1991 |
| JP | 03-074745 | 3/1991 |
| JP | H03245939 A | 11/1991 |
| JP | 04-172039 | 6/1992 |
| JP | 04-229746 | 8/1992 |
| JP | 05-089048 | 4/1993 |
| JP | 05-143488 | 6/1993 |
| JP | 06-075890 | 3/1994 |
| JP | 06-342382 A | 12/1994 |

(56) References Cited

FOREIGN PATENT DOCUMENTS

| | | |
|---|---|---|
| JP | H07-036760 A | 2/1995 |
| JP | Hei 08-314784 | 11/1996 |
| JP | 1998-013397 | 1/1998 |
| JP | H10-133971 | 5/1998 |
| JP | 10-313342 | 11/1998 |
| JP | H11-015786 | 1/1999 |
| JP | 11-055314 | 2/1999 |
| JP | 11-265361 A | 9/1999 |
| JP | 2000-066922 A | 3/2000 |
| JP | 2000163369 | 6/2000 |
| JP | 2001077844 | 3/2001 |
| JP | 2001-094613 | 4/2001 |
| JP | 2003-016766 | 1/2003 |
| JP | 2003032727 A | 1/2003 |
| JP | 2003-504699 | 2/2003 |
| JP | 2003-069610 | 3/2003 |
| JP | 2003-281091 | 3/2003 |
| JP | 2003-125022 | 4/2003 |
| JP | 2003-196178 A | 7/2003 |
| JP | 2003-337717 | 11/2003 |
| JP | 2004-005427 | 1/2004 |
| JP | 2004078949 | 3/2004 |
| JP | 2004139385 A | 5/2004 |
| JP | 2004-227566 | 8/2004 |
| JP | 2004-229143 | 8/2004 |
| JP | 2005032172 | 2/2005 |
| JP | 2005517241 | 6/2005 |
| JP | 2005-322016 | 11/2005 |
| JP | 2006-079603 | 3/2006 |
| JP | 2006-113735 | 4/2006 |
| JP | 2006191617 | 7/2006 |
| JP | 2006-333433 | 12/2006 |
| JP | 2006-333434 | 12/2006 |
| JP | 2007-49755 | 2/2007 |
| JP | 2007-058506 | 3/2007 |
| JP | 3967758 | 6/2007 |
| JP | 2010009090 | 1/2010 |
| KR | 10-1994-0001700 | 3/1994 |
| KR | 100272567 B1 | 11/2000 |
| KR | 10-0860152 | 9/2008 |
| RU | 2118051 C1 | 8/1998 |
| RU | 2313824 C2 | 12/2007 |
| RU | 2365983 C2 | 8/2009 |
| RU | 2368944 C2 | 9/2009 |
| RU | 2380749 C2 | 1/2010 |
| WO | WO 2001/077844 | 10/2001 |
| WO | WO 03/096646 | 11/2003 |
| WO | WO 03105439 | 12/2003 |
| WO | 2004003765 | 1/2004 |
| WO | WO 2004/003765 | 1/2004 |
| WO | 2005048025 A2 | 5/2005 |
| WO | 2013036697 A2 | 3/2013 |

OTHER PUBLICATIONS

Almeida, "FIFS: A Framework for Implementing User-Mode File Systems in Windows NT", Proceedings of the 3rd USENIX Windows NT Symposium, Jul. 12-15, 1999, 19 pgs.
Alvisi et al., "Low-Overhead Protocols for Fault-Tolerant File Sharing"; In Proceedings of the IEEE 18th International Conference on Distributed Computing Systems; 1998; 10 pgs.
Ansi, Financial Institution Message Authentication (Wholesale), Financial Services Technical Publication, ANSI X9.9-1994, Aug. 15, 1986; 38 pgs.
Asokan et al., Server Supported Signatures, Journal of Computer Security, Fall 1997; 13 pgs.
Bell Labs, Plan 9 default Fossil File System [online], [Retrieved Sep. 17, 2007], Retrieved from: http://plan9.bell-labs.com/magic/man2html/4/fossil; 4 pgs.
Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.

Chinese 1st Office Action and Search Report Issued in Chinese Patent Application No. 201280032558.7, dated Aug. 5, 2015, 19 Pages.
Chinese 1st Office Action in Application 201110329007.4, dated Oct. 10, 2013, 13 pgs.
Chinese 1st Office Action in Application 201110462797.3, dated Apr. 16, 2014, 11 pgs.
Chinese 1st Office Action in Application 201210330725.8, dated Oct. 10, 2014, 11 pgs,.
Chinese 1st Office Action in Application 201210331041.X, dated Sep. 3, 2014, 14 pgs.
Chinese 1st Office Action in Application 201210434813.2, dated Nov. 3, 2014, 10 pgs.
Chinese 2nd Office Action in Application 201110329007.4, dated Jun. 12, 2014, 8 pgs.
Chinese 2nd Office Action in Application 201110462797.3, dated Sep. 24, 2014, 6 pgs.
Chinese 2nd Office Action in Application 201210330725.8, dated Jul. 1, 2015, 7 pgs.
Chinese 2nd Office Action in Application 201210331041.X, dated Mar. 9, 2015, 10 pgs.
Chinese 2nd Office Action in Application 201210434813.2, dated Jun. 30, 2015, 7 pgs.
Chinese 3rd Office Action in Application 201110329007.4, dated Dec. 29, 2014, 6 pgs.
Chinese 3rd Office Action in Application 201210331041.X, dated Aug. 18, 2015, 7 pgs.
Chinese 4th Office Action in Application 200510127998.2, dated Nov. 16, 2011, 7 pgs.
Chinese 5th Office Action in Application 200510127998.2, dated Mar. 2, 2012, 8 pgs.
Chinese Notice of Allowance in Application 2005101279978.2, dated Dec. 5, 2011, 4 pgs.
Chinese Notice of Allowance in Application 200510127998.2, dated Aug. 20, 2012, 4 pgs.
Chinese Notice of Allowance in Application 201110329007.4, dated Jul. 1, 2015, 6 pgs.
Chinese Notice of Allowance in Application 201110462797.3, dated Mar. 3, 2015, 4 pgs.
Chinese Notice of Entering into Substantive Examination in Application 201210331041.X, dated Mar. 6, 2013, 3 pgs.
Chinese Office Action dated Apr. 29, 2010 in Application No. 200510127997.8, 16 pgs.
Chinese Office Action dated Apr. 29, 2010 in Application No. 200510127998.2, 10 pgs.
Chinese Second Office Action dated Mar. 3, 2011 in Application No. 200510127998.2, 8 pgs.
Chinese Second Office Action dated Mar. 30, 2011 in Application No. 200510127997.8, 26 pgs.
Chinese Third Office Action dated Jul. 7, 2011 in Application No. 200510127998.2, 9 pgs.
CIFS http://msdn.microsoft.com/library/en-us/cifs/protocol/cifs.asp?frame=true, obtained online Oct. 23, 2006, obtained online Oct. 23, 2006, 2 pgs.
CIFS Oplock File Locking, MSDN, [Retrieved Jan. 7, 2008], Retrieved from: http://msdn2.microsoft.com/en-us/library/aa302210.aspx; 3 pgs.
CIFS or Public SMB Information on Common Internet File System http://support.microsoft.com/default.aspx ?scid=kb;en-us;199072; obtained online Oct. 23, 2006, 2 pgs.
Defense Advanced Research Projects Agency, by Information Sciences Institute Univ. of So. CA., "Internet Protocol—DARPA Internet Program Protocol Specification"; Available at: https://www.rfc-editor.org/rfc/rfc791.txt, Sep. 1, 1981, 52 pgs.
Dehaese, G., *The ISO 9660 File System* [online], May 1995, [Retrieved Sep. 14, 2007], Retrieved from: http://users.pandora.be/it3.consultants.bvba/handouts/ISO9960.html.
Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 65 pgs.

(56) References Cited

OTHER PUBLICATIONS

Digital Equipment Corporation, *RSX-11M/M-Plus RMS-11 User's Guide* [online], Order No. AA-L669A-TC, Apr. 1983, [Retrieved Aug. 17, 2007], Retrieved from: http://www.computer.museum.uq.edu.au/RSX-11%20Manuals.html; 186 pgs.
ECMA, Volume and File Structure for Write-Once and Rewritable Media using Non-Sequential Recording for Information Interchange 3rd Edition [online], ECMA-167, Jun. 1997, [Retrieved Aug. 9, 2007], Retrieved from: http://www.ecma-international.org/publications/files/ECMA-ST/Ecma-167.pdf; 150 pgs.
European Communication and partial Search Report in Application 12830847.5, dated Mar. 18, 2015, 6 pgs.
European Communication in Application 11846483.3, dated Jan. 12, 2015, 1 page.
European Communication in Application 12804233.0, dated Jul. 31, 2015, 1 page.
European Communication in Application 12805065.5, dated Jun. 18, 2015, 1 page.
European Communication in Application 12829430.3, dated Mar. 3, 2015, 1 page.
European Communication in Application 12830847.5, dated Jul. 24, 2015, 1 page.
European Exam Report in Application 05111885.9 dated Sep. 13, 2007, 5 pgs.
European extended Search Report in Application 12804233.0, dated Jul. 15, 2015, 18 pgs.
European Extended Search Report in Application 12829430.3, dated Feb. 12, 2015, 6 pgs.
European extended Search Report in Application 12830847.5, dated Jul. 7, 2015, 11 pgs.
European Intention to Grant in Application 10013021.0, dated Jan. 28, 2014, 7 pgs.
European Invitation to Correct Defects in Application No. 08008916.2 dated Sep. 4, 2008, 6 pgs.
European Notice of Allowance in Application 05111885.9 dated Jun. 11, 2008, 6 pgs.
European Notice of Allowance in Application 080089162 dated Jan. 24, 2011, 6 pgs.
European Notice of Allowance in Application 11846483.3, dated Aug. 11, 2015, 7 pgs.
European Notice to Grant in Application 05111885.9 dated Oct. 9, 2008, 1 page.
European Office Action in Application 12829430.3, dated Oct. 6, 2015, 4 pgs.
European Partial Search Report in Application 12804233.0, dated May 7, 2015, 7 pgs.
European Search Report dated Feb. 1, 2011 in Application No. 10013021.0, 9 pgs.
European Search Report dated Feb. 15, 2006 in Application No. 05111729.9, 193 pgs.
European Search Report dated Feb. 22, 2006 in Application No. 05111729.9, 8 pgs.
European Search Report dated Jan. 20, 2006 in Application No. RS113279/US18298905, 2 pgs.
European Search Report dated Jan. 20, 2006 in Application No. RS113280/US18225105, 4 pgs.
European Search Report dated Jan. 4, 2011 in Application No. 10012923.8, 9 pgs.
European Search Report dated Jun. 18, 2008 in Application No. 08008916.2, 9 pgs.
European Search Report dated Sep. 19, 2006 in Application No. 055111885.9, 8 pgs.
European Search Report in Application 12805065.5, dated Jun. 1, 2015, 9 pgs.
European Supplementary Search Report in Application 11846483.3, dated Dec. 16, 2014, 10 pgs. French, Steven M., "A New Network File System is Born: Comparison of SMB2, CIFS, and NFS", retrieved Mar. 23, 2011, 14 pgs.
French, Steven M., "A New Network File System is Born: Comparison of SMB2, CIFS, and NFS", retrieved Mar. 23, 2011, 14 pgs.

Gifford et al., *The Cedar File System*, Communications of the ACM, vol. 31, No. 3, Mar. 1998; 11 pgs.
Greenberg et al., "NFILE—A File Access Protocol"; Network Working Group; RFC 1037; Dec. 1997; 43 pgs.
Gu et al., "SABUL: A High Performance Data Transfer Protocol"; IEEE Communications Letters; 2001; 11 pgs.
Hartman; "The Zebra Striped Network File System"; Doctoral dissertation at the University of California at Berkeley; 1991; 159 pgs.
Hertel, Implementing CIFS the Common Internet File System [online], [Retrieved Jul. 13, 2007], Retrieved from: http://ubiqx.org/cifs/; 3 pgs.
Hiltunen et al., "Implementing Integrated Fine-Grain Customizable QoS Using Cactus"; The 29th Annual International Symposium on Fault-Tolerant Computing (Fast Abstract); Madison, WI; 1999, 2 pgs.
Hitz et al., File System Design for an NFS File Server Appliance [online], Network Appliance, TR 3002, 1994, [Retrieved Aug. 9, 2007], Retrieved from: http://www.netapp.com/library/tr/3002.pdf; 13 pgs.
Hobbit, CIFS: Common Insecurities Fail Scrutiny [online], Avian Research, Jan. 1997, Retrieved from: http://web.textfiles.com/hacking/cifs.txt; 39 pgs.
Hong Kong Certificate of Grant in Application 07105689.8 dated Jun. 26, 2009, 2 pgs.
IBM, IBM Personal Computer Seminar Proceedings, vol. 2, No. 5, Sep. 1984; 13 pgs.
Indian First Exam Report in Application 3305/DE/L2005, dated Mar. 28, 2013, 2 pgs,.
Indian Office Action in Patent Application No. 3306/DEL/2005, dated Aug. 10, 2015, 2 pages.
International Organization for Standardization, Banking—Approved algorithms for message authentication—, ISO 8731-1, Jun. 1, 1987; 4 pgs.
Internet Assigned Numbers Authority, Well-Known Port Numbers, http://www.jana.org/assignments/port-numbers, obtained online on Oct. 5, 2006, 233 pgs.
Japanese Office Action in Application 200510127997.8 dated Aug. 3, 2011, 8 pgs.
Japanese Office Notice of Allowance in Application 2006-307121 dated Feb. 14, 2012, 6 pgs.
Japanese Office Notice of Rejection in Application 2006-307121 dated Aug. 12, 2011, 5 pgs,.
Japanese Office Notice of Rejection dated Apr. 3, 2007 in Application No. 2005-356145, 6 pgs.
Japanese Office Notice of Rejection dated Jan. 15, 2008 in Application No. 2005-356145, 5 pgs.
Japanese Office Notice of Rejection dated Mar. 10, 2006 in Application No. 2005-356146, 5 pgs.
Japanese Office Notice of Rejection dated May 12, 2006 in Application No. 2005-356145, 4 pgs.
Japanese Office Notice of Rejection dated Nov. 10, 2006 in Application No. 2005-356146, 3 pgs.
John H. Samba Team Terpstra, "Chapter 32. High Availability Part III. Advanced Configuration", retrieved Mar. 22, 2011, 6 pages.
Kent et al., IP Authentication Header [online], RFC 2402, Nov. 1998, [Retrieved Aug. 9, 2007], Retrieved from: http//tools.ietf.org/html/rfc2402, 20 pgs.
Kent et al., Security Architecture for the Internet Protocol [online], RFC 2401, Nov. 1998, [Retrieved Jun. 6, 2007], Retrieved from: http://www.ietf.rg/rfc/rfc2401.txt? number=2401, 62 pgs.
Klima, "Tunnels in Hash Functions: MD5 Collisions Within a Minute", Version 1, Mar. 2006, Version 2 Apr. 2006, Cryptology ePrint Archive, 17 pgs.
Korean Notice of Preliminary Rejection dated Jan. 21, 2011, Application No. 2007-0080691, 4 pgs.
Korean Notice of Rejection dated Nov. 17, 2006 in Application No. 10-2005-0124340, 5 pgs.
Krawczyk, "HMAC: Keyed-Hashing for Message Authentication", RFC-2104, Feb. 1997, http://www.jetf.org/rfc/rfc2104.txt, 10 pgs.
Leach et al., CIFS Logon and Pass Through Authentication Preliminary Draft [online], Jan. 3, 1997, 22 pgs.

(56) References Cited

OTHER PUBLICATIONS

Leach et al., CIFS/E Browser Protocol Preliminary Draft [online], Jan. 10, 1997, 33 pgs.
Leach et al., draft-leach-cifs-print-spec-00.txt, CFIS Printing Specification Preliminary Draft [online], Jan. 31, 1997; 30 pgs.
Leach et al., draft-leach-cifs-rap-spec-00.txt, CFIS Remote Administration Protocol Preliminary Draft [online], Feb. 26, 1997; 39 pgs.
Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS: 160 pgs.
Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.
LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.
Linn, "Generic Security Service Application Program Interface, Version 2, Update 1", RFC 2743, Jan. 2000, http://www.ieft.org/rfc/rfc2743,txt, 90 pgs.
Loafman, Zach, "SMB1/SMB2; A BSD Perspective", retrieved Mar. 22, 2011, 35 pgs.
Maiworm, Daniel, "Symantec Enterprise Vault", Retrieved at http://www.cstl.com/products/Symantec/Symantec-Enterprise_Vault/File System Archiving.pdf, Feb. 5, 2007, pp. 35.
Microsoft Computer Dictionary, Microsoft Press, Fifth Edition, 2002, p. 486.
MS-SMB2—Preview: Server Message Block (SMB) Version 2 Protocol Specification, copyright 2010 Microsoft Corporation, 309 pgs.
Morris, "Andrew: A Distributed Personal Computing Environment", Communications of the ACM, vol. 29, No. 3, Mar. 1986, New York, 20 pgs.
Mullender, "A Distributed File Service Based on Optimistic Concurrency Control", Proceedings of the Tenth ACM Symposium on Operating Systems Principles, Dec. 1-4, 1985, Orcas Island, WA, 14 pgs.
Murphy, Origins and Development of TOPS-20 [online], © 1989, 1996, [Retrieved Aug. 9, 2007], Retrieved from: http://www.opost.com/dlm/tenex/hbook.html; 28 pgs.
National Bureau of Standards, *Computer Data Authentication*, Federal Information Processing Standards Publication 113, May 30, 1985; 9 pgs.
New Zealand Examination Report in Application 622122, dated Aug. 28, 2014, 2 pgs.
New Zealand Notice of Acceptance in Application 622122, dated Jan. 15, 2015, 1 page.
NTFS Design Goals and Features, Retrieved at http://wininternals.uw.hu/ch12lev1sec4.html, Retrieved Date: Oct. 11, 2010, pp. 9.
Oehme, et al., "IBM Scale out File Services: Reinventing network-attached storage", Retrieved at http://www-935.ibm.com/services/us/its/pdf/sofs-am-journal-final-07010B.pdf, vol. 52 No. 4/5 Jul./Sep. 200B, 10 Pages.
Pawlowski, Brian et al. "The NFS Version 4 Protocol", Proceedings of the 2nd International System Administration and Networking Conference (SANE 2000). vol. 2. No. 5. 2000, 20 pgs.
PCT International Search Report and Written Opinion in International Application PCT/US2011/063618, dated Jun. 28, 2012, 9 pgs.
PCT International Search Report and Written Opinion in International Application PCT/US2012/041049, dated Jan. 17, 2013, 12 pgs.
PCT International Search Report and Written Opinion in International Application PCT/US2012/041703, dated Feb. 14, 2013, 13 pgs.
PCT International Search Report and Written Opinion in International Application PCT/US2012/054038, dated Feb. 20, 2013, 10 pgs.
PCT International Search Report and Written Opinion in International Application PCT/US2012/054039, dated Feb. 27, 2013, 11 pgs.
Periasamy, Anand Babu, "Next-Gen Linux File Systems: Change Is the New Constant", retrieved Mar. 23, 2011, 4 pages.
Platform SDK: File Systems: Microsoft SMB Protocol and CIFS Protocol Overview http://msdn.microsoft.com/library/default.asp?url=/library/en-us/fileio/fs/microsoft_smb_protocol_and_cifs_protocol_overview.asp; obtained online on Aug. 3, 2011, 1 pg.
Pranevich, "The Wonderful World of Linux 2.6"; 2005; 17 pgs.
Recio, R. et al., "A Remote Direct Memory Access Protocol Specification", Network Working Group Request for Comments: 5040, Available at: https://tools.ietf.org/html/rfc5040, Oct. 1, 2007, 66 pgs.
Rivest, "The MD5 Message-Digest-Algorithm", RFC 1321; Apr. 1992, http://www.jetf.org/rfc/rfc2104.txt, 19 pgs.
Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.
Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html; 4 pgs.
Sapuntzakis, C. et al., Internet Draft: "TCP RDMA option"; Available at: draft-csapuntz-tcprdma-00.txt, Feb. 1, 2000, 20 pgs.
Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720; 67 pgs.
Satyanaryanan et al, "Scalable, Secure and Highly Available Distributed File Access", May 1990, 12 pgs.
Schneier, B., *Applied Cryptography Protocols, Algorithm and Source Code in C Second Edition*, John Wiley & Sons, Inc., © 1996; 788 pgs.
Shepler, S. et al., "Network File System (NFS) Version 4 Protocol", Network Working Group, Request for Comments: 3530, Apr. 2003, 275 pgs.
Shepler, S. et al., "NFS Version 4 Protocol", RFC 3010, Proceedings on the 2nd International System Administration and Networking Conference (SANE2000), Dec. 2000, 212 pgs.
Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.
SMB: The Server Message Block Protocol [online], 1999, Retrieved from: http://ubiqx.org/cifs/SMB.html; 143 pgs.
SNIA, *Common Internet File System (CIF) Technical Reference* [online], Mar. 1, 2002, Retrieved from: http://www.snia.org/tech_activities/CIFS/CIFS-TR-1p00_FINAL.pdf; 150 pgs.
Soules et al., *Metadata Efficiency in a Comprehensive Versioning File System*, May 2002; 33 pgs.
South African Notice of Allowance in Application 2014/01381, dated May 5, 2015, 1 page.
Srinivasan et al., Spritely NFS: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.
Szczerbina, "Novell's NetWare Core Protocol", Dr. Dobb's Journal, Nov. 1993, 17 pgs.
Talpey et al., "NFSv4 Session Extensions, draft-ietf-nfsv4-sess-01"; Internet Draft; The Internet Society; Feb. 2005; 70 pgs.
The Java CIFS Client Library [online], [Retrieved Jul. 13, 2007], Retrieved from: http://jcifs.samba.org/, 8 pgs.
The Open Group; Technical Standard; Protocols for X/Open PC Interworking: SMB, Version 2; http://www.opengroup.org/onlinepubs/9697999099/toc.pdf; retrieved on Sep. 1, 1992; 534 pgs.
Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.
TOPS-20 [offline], Wikipedia, [Retrieved Mar. 4, 2007], Retrieved from: http://en.wikipedia.org/wiki/TOPS-20; 4 pgs.
Tridgell, "Inside Microsoft Networking", Jun. 25, 1998, 6 pgs.
U.S. Official Action dated Feb. 2, 2010 cited in U.S. Appl. No. 11/182,989, 18 pgs.
U.S. Official Action dated Jan. 25, 2010 cited in U.S. Appl. No. 11/182,251, 20 pgs.
U.S. Official Action dated Jul. 23, 2010 cited in U.S. Appl. No. 11/182,989, 17 pgs.

(56) References Cited

OTHER PUBLICATIONS

U.S. Official Action dated Jul. 30, 2010 cited in U.S. Appl. No. 11/182,251, 23 pgs.
U.S. Official Action dated Mar. 13, 2009 cited in U.S. Appl. No. 11/182,251, 20 pgs.
U.S. Official Action dated May 14, 2009 cited in U.S. Appl. No. 11/182,989, 23 pgs.
U.S. Appl. No. 11/18.2,251, Amendment and Response filed Oct. 11, 2012, 2 pgs.
U.S. Appl. No. 11/182,251, Amendment and Response filed Nov. 26, 2008, 12 pgs.
U.S. Appl. No. 11/182,251, Amendment and Response filed Nov. 30, 2010, 17 pgs.
U.S. Appl. No. 11/182,251, Amendment and Response filed Nov. 4, 2011, 17 pgs.
U.S. Appl. No. 11/182,251, Amendment and Response filed Apr. 26, 2010, 17 pgs.
U.S. Appl. No. 11/182,251, Amendment and Response filed May 30, 2012, 14 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251 Notice of Allowance dated Jul. 12, 2012, 8 pgs.
U.S. Appl. No. 11/182,251, Office Action dated Jan. 30, 2012, 24 pgs.
U.S. Appl. No. 11/182,251, Office Action dated Nov. 6, 2008, 4 pgs.
U.S. Appl. No. 11/182,251, Office Action dated Aug. 22, 2008, 7 pgs.
U.S. Appl. No. 11/182,251, Office Action dated Aug. 4, 2011, 23 pgs.
U.S. Appl. No. 12/964,749, Amendment and Response filed Apr. 29, 2013, 9 pgs.
U.S. Appl. No. 12/964,749, Amendment and Response filed Aug. 23, 2013, 8 pgs.
U.S. Appl. No. 12/964,749, Notice of Allowance dated Nov. 15, 2013, 2 pgs.
U.S. Appl. No. 12/964,749, Notice of Allowance dated Sep. 5, 2013, 11 pgs.
U.S. Appl. No. 12/964,749, Office Action dated Jan. 29, 2013, 17 pgs.
U.S. Appl. No. 12/964,749, Office Action dated May 23, 2013, 13 pgs.
U.S. Appl. No. 13/172,757, Amendment and Response filed Mar. 6, 2014, 16 pgs.
U.S. Appl. No. 13/172,757, Amendment and Response filed Jul. 10, 2016, 17 pgs.
U.S. Appl. No. 13/172,757, Amendment and Response filed Aug. 19, 2013, 14 pgs.
U.S. Appl. No. 13/172,757, Office Action dated Dec. 6, 2013, 27 pgs.
U.S. Appl. No. 13/172,757, Office Action dated Apr. 10, 2015, 34 pgs.
U.S. Appl. No. 13/172,757, Office Action dated Apr. 19, 2013, 23 pgs.
U.S. Appl. No. 13/174,271, Amendment and Response filed Apr. 10, 2014, 10 pgs.
U.S. Appl. No. 13/174,271, Notice of Allowance dated May 29, 2014, 10 pgs.
U.S. Appl. No. 13/174,271, Notice of Allowance dated Aug. 8, 2014, 2 pgs.
U.S. Appl. No. 13/174,271, Office Action dated Jan. 10, 2014, 17 pgs.
U.S. Appl. No. 13/174,271, Supplemental Notice of Allowance dated Sep. 8, 2014, 2 pgs.
U.S. Appl. No. 13/228,732, Amendment after Allowance dated Jun. 4, 2014, 7 pgs.
U.S. Appl. No. 13/228,732 Amendment and Response filed Nov. 8, 2013, 15 pgs.
U.S. Appl. No. 13/228,732, Notice of Allowance dated Mar. 4, 2014, 17 pgs.
U.S. Appl. No. 13/228,732, Office Action dated Jul. 8, 2013, 16 pgs.
U.S. Appl. No. 13/228,732, USPTO response to Amendment after Allowance dated Jun. 27, 2014, 2 pgs.
U.S. Appl. No. 13/228,818, Amendment and Response dated Oct. 18, 2013, 24 pgs.
U.S. Appl. No. 13/228,818, Amendment and Response filed Nov. 17, 2014, 14 pgs.
U.S. Appl. No. 13/228,818, Amendment and Response filed Nov. 25, 2013, 28 pgs.
U.S. Appl. No. 13/228,818, Amendment and Response filed Jun. 16, 2014, 15 pgs.
U.S. Appl. No. 13/228,818, Office Action dated Mar. 14, 2014, 18 pgs.
U.S. Appl. No. 13/228,818, Office Action dated Mar. 25, 2015, 18 pgs.
U.S. Appl. No. 13/228,818, Office Action dated Jul. 18, 2013, 18 pgs.
U.S. Appl. No. 13/228,818, Office Action dated Aug. 15, 2014, 17 pgs.
U.S. Appl. No. 13/663,827, Advisory Action dated Aug. 22, 2013, 3 pgs.
U.S. Appl. No. 13/663,827, Amendment and Response filed Apr. 29, 2013, 10 pgs.
U.S. Appl. No. 13/663,827, Amendment and Response filed Aug. 6, 2013, 7 pgs.
U.S. Appl. No. 13/663,827, Amendment and Response filed Sep. 9, 2013, 8 pgs.
U.S. Appl. No. 13/663,827, Notice of Allowance dated Jan. 13, 2014, 10 pgs.
U.S. Appl. No. 13/663,827, Notice of Allowance dated Apr. 25, 2014, 10 pgs.
U.S. Appl. No. 13/663,827, Notice of Allowance dated Sep. 26, 2013, 11 pgs.
U.S. Appl. No. 13/663,827, Office Action dated Jan. 29, 2013, 16 pgs.
U.S. Appl. No. 13/663,827, Office Action dated May 7, 2013, 16 pgs.
U.S. Appl. No. 13/664,012, Amendment and Response filed Mar. 19, 2014, 7 pgs.
U.S. Appl. No. 13/664,012, Amendment and Response filed Apr. 24, 2013, 10 pgs.
U.S. Appl. No. 13/664,012, Amendment and Response filed Jul. 30, 2013, 12 pgs.
U.S. Appl. No. 13/664,012, Notice of Allowance dated Dec. 24, 2013, 11 pgs.
U.S. Appl. No. 13/664,012, Notice of Allowance dated May 20, 2014, 13 pgs.
U.S. Appl. No. 13/664,012, Notice of Allowance dated Sep. 12, 2013, 14 pgs.
U.S. Appl. No. 13/664,012, Office Action dated Jan. 25, 2013, 19 pgs.
U.S. Appl. No. 13/664,012, Office Action dated Apr. 30, 2013, 16 pgs.
U.S. Appl. No. 13/946,550, Office Action dated Sep. 23, 2015, 24 pgs.
U.S. Appl. No. 14/473,488, Notice of Allowance dated Jan. 26, 2015, 15 pgs.
U.S. Appl. No. 14/473,488, Notice of Allowance dated Feb. 12, 2015, 5 pgs.
U.S. Appl. No. 14/473,488, Notice of Allowance dated Apr. 16, 2015, 2 pgs.
U.S. Appl. No. 14/475,081, Office Action dated Aug. 18, 2015, 17 pgs.
U.S. Appl. No. 14/720,083, Office Action dated Jul. 1, 2015, 28 pgs.
U.S. Appl. No. 11/182,989, Amendment and Response filed Dec. 1, 2011, 13 pgs.
U.S. Appl. No. 11/182,989, Amendment and Response filed May 29, 2012, 11 pgs.
U.S. Appl. No. 11/182,989, Amendment and Response dated Oct. 19, 2009, 6 pgs.

(56) References Cited

OTHER PUBLICATIONS

U.S. Appl. No. 11/182,989, Amendment arid Response dated Oct. 29, 2010, 14 pgs.
U.S. Appl. No. 11/182,989, Amendment and Response dated Nov. 26, 2008, 12 pgs.
U.S. Appl. No. 11/182,989, Amendment and Response dated May 3, 2010, 14 pgs.
U.S. Appl. No. 11/182,989, Amendment and Response dated Aug. 14, 2009, 11 pgs.
U.S. Appl. No. 11/182,989, Notice of Allowance dated Jun. 21, 2012, 5 pgs.
U.S. Appl. No. 11/182,989, Office Action dated Feb. 28, 2012, 20 pgs.
U.S. Appl. No. 11/182,989, Office Action dated Sep. 1, 2011, 19 pgs.
U.S. Appl. No. 11/182,989, Office Action dated Sep. 5, 2008, 6 pgs.
Vanwasi, "Unleashing the power of P2P"; Network Magazine India; Apr. 2002; 5 pgs.
Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
U.S. Appl. No. 14/475,081, Amendment and Response filed Nov. 18, 2015, 14 pgs.
U.S. Appl. No. 13/172,757, Notice of Allowance dated Nov. 12, 2015, 11 pgs.
Japanese Office Action in Application 2013-543293, dated Nov. 4, 2015, 15 pgs.
Chinese Office Action in Application 201280032570.8, dated Dec. 11, 2015, 15 pgs.
Chinese Notice of Allowance in Application 201210434813.2, dated Oct. 10, 2015, 4 pgs.
U.S. Appl. No. 14/720,083, Amendment and Response filed Sep. 16, 2015, 12 pgs.
Australian Office Action in Application 2012275906, dated Jan. 11, 2016, 3 pgs.
Chinese 4th Office Action in Application 201210331041.X, dated Jan. 20, 2016, 10 pgs.
Chinese 3rd Office Action in Application 201210330725.8, dated Jan. 20, 2016, 11 pgs.
Israeli Communication in Application 231373, dated Dec. 28, 2015, 3 pgs.
Singapore Notice of Allowance and Supplemental Examination Report in Application 11201400442S , dated Jan. 26, 2016, 4 pgs.
U.S. Appl. No. 13/946,550, Amendment and Response filed Dec. 23, 2015, 10 pgs.
U.S. Appl. No. 14/720,083, Notice of Allowance dated Dec. 22, 2015, 8 pgs.
U.S. Appl. No. 14/720,083, Notice of Allowance dated Jan. 11, 2016, 2 pgs.
U.S. Appl. No. 14/475,081 Office Action dated Jan. 21, 2016, 18 pgs.
U.S. Appl. No. 13/172,757, Notice of Allowance dated Jan. 21, 2016, 2 pgs.
Chinese 2nd Office Action in Application 201280032558.7, dated Mar. 28, 2016, 6 pgs.
Australian Office Action in Application 2011338485, dated Mar. 18, 2016, 2 pgs.
Russian Notice of Allowance in Application 2013126471, dated Feb. 29, 2016, 18 pgs.
European Notice of Allowance in Application 12804233.0, dated Apr. 7, 2016. 7 pgs.
Japanese office Action in Application 2014-518599, dated Apr. 14, 2016, 7 pgs.
Russian Notice of Allowance in Application 2013158710, dated Apr. 5, 2016, 16 pgs.
U.S. Appl. No. 14/475,081, Amendment and Response filed Apr. 21, 2016, 12 pgs.
U.S. Appl. No. 14/475,081, Notice of Allowance dated May 24, 2016, 5 pgs.
U.S. Appl. No. 13/172,757, Notice of Allowance dated Mar. 31, 2016, 2 pgs.
U.S. Appl. No. 13/946,550, Notice of Allowance dated Apr. 26, 2016, 12 pgs.
European Notice of Allowance in Application 05111729.9, dated Mar. 23, 2016, 7 pgs.
European Notice of Allowance in Application 10012923.8, dated Apr. 5, 2016, 7 pgs.
U.S. Appl. No. 14/720,083, Notice of Allowance dated Apr. 1, 2016, 2 pgs.
European Notice of Allowance in Application 12829430.3, dated Apr. 29, 2016, 7 pgs.
Russian Notice of Allowance in Application 2014108995, dated Apr. 1, 2016, 13 pgs.
Australian Notice of Allowance in Application 2012275906, dated May 24, 2016, 2 pages.
Japanese Notice of Allowance in Application 2014518599, dated Jun. 17, 2016, 3 pages. (No English Translation.).
U.S. Appl. No. 14,475,081, Notice of Allowance dated Jun. 7, 2016, 2 pages.
Israel Office Action in Application 231373, dated Jun. 21, 2016, 2 pages.
Japanese Office Action in Application 2014-529876, dated May 24, 2016, 8 pages.
U.S. Appl. No 13/946,550, Notice of Allowance dated Jun. 3, 2016, 2 pages.
Japanese Office Action Issued in Japanese Patent Application No. 2016204949, dated Sep. 28, 2017, 11 Pages.
Canadian Notice of Allowance in Application 2817620, dated Aug. 28, 2017, 1 page.
Japanese Office Action in Application 2016139400, dated Jul. 21, 2017, 9 pages.
Japanese Notice of Allowance in Application 2014529876, dated Aug. 14, 2017, 4 pgs.
Philippines Office Action in Application 1-2014-500504, dated Oct. 16, 2017, 2 pgs.
U.S. Appl. No. 14/834,959, Amendment and Response filed Sep. 11, 2017, 22 pgs.
U.S. Appl. No. 14/834,959, Office Action dated Oct. 4, 2017, 16 pgs.
European Search Report in Application 17165513.7, dated Jun. 26, 2017, 8 pgs.
Japanese Notice of Allowance in Application 2013-543293, dated Apr. 4, 2017, 3 pgs. (No English translation).
European Notice of Allowance in Application 16159584.8, dated Mar. 24, 2017, 7 pgs.
Australian Notice of Allowance in Application 2012304549, dated Mar. 27, 2016, 4 pgs.
Chinese Notice of Allowance in Application 201280032570.8, dated Mar. 2, 2017, 4 pgs.
Australia Notice of Allowance in Application 2012304550, dated Jan. 16, 2017, 3 pgs.
European Notice of Allowance in Application 12830847.5, dated Dec. 21, 2016, 7 pgs.
U.S. Appl. No. 14/834,959, Office Action dated Mar. 10, 2017, 16 pgs.
U.S. Appl. No. 14/834,959, Amendment and Response filed Nov. 23, 2016, 12 pgs.
European Notice of Allowance in Application 12804233.0, dated Oct. 17, 2016, 7 pgs.
Australian Office Action in Application 2012304549, dated Nov. 18, 2016, 2 pgs.
European Notice of Allowance in Application 12829430.3, dated Sep. 22, 2016, 7 pgs.
Japanese Notice of Allowance Issued in Japanese Patent Application No. 2014-518588, dated Oct. 20, 2016, 4 Pages.
Russian Notice of Allowance in Application 2014108994, dated Nov. 22, 2016, 16 pgs.
Japanese Office Action in Application 2014-529876, dated Dec. 28, 2016, 11 pgs.
U.S. Appl. No. 13/946,550, Amendment and Response filed Jun. 28, 2016, 146 pgs.
U.S. Appl. No. 13/946,550, USPTO Response, dated Jul. 1, 2016, 2 pgs.

(56) References Cited

OTHER PUBLICATIONS

European Extended Search Report in Application 16159584.8, dated Jul. 5, 2016, 11 pgs.
Chinese Notice of Allowance in Application 201210330725.8, dated Jul. 13, 2016, 4 pgs.
U.S. Appl. No. 13/946,550, Notice of Allowance dated Aug. 3, 2016, 2 pgs.
Japanese Office Action in Application 2013-543293, dated Aug. 2, 2016, 12 pgs.
Japanese Office Action in Application 2014-529877, dated Jul. 19, 2016, 11 pgs.
Australian Office Action in Application 2012304549, dated Aug. 12, 2016, 3 pgs.
Australian Notice of Allowance in Application 2011338485, dated Jul. 11, 201, 2 pgs.
U.S. Appl. No. 14/475,081, Amendment after Allowance dated Aug. 24, 2016, 3 pgs.
U.S. Appl. No. 14/475,081, Notice of Allowance dated Aug. 31, 2016, 3 pgs.
U.S. Appl. No. 14/834,959, Office Action dated Aug. 24, 2016, 14 pgs.
Chinese Notice of Allowance in Application 201280032558.7, dated Aug. 3, 2016, 4 pgs.
Indian Exam Report in Application 3306/DEL/2005, dated Aug. 10, 2015, 2 pgs.
Japanese Office Action Issued in Patent Application No. 2014-518588, dated Apr. 21, 2016, 6 Pages.
Russian Office Action in Application 2014108994, dated Aug. 18, 2016, 5 pgs.
Australian Office Action in Application 2012304550, dated Sep. 2, 2016, 4 pgs.
European Extended Search Report in Application 16179836.8, dated Oct. 20, 2016, 9 pgs.
"Server Message Block (SMB) Version 2 Protocol Specification", Available at: https://web.archive.org/web/20100512200032/http://download.microsoft.com/download/a/e/6/ae6e4142-aa58-45c6-8dcf-a657e5900cd3/[MS-SMB2].pdf, Aug. 20, 2010, 341 Pages.
"Extended Search Report Issued in European Patent Application No. 05111885.9", dated Jan. 22, 2007, 8 Pages.
"Office Action Issued in Korean Patent Application No. 10-2005-0124340", dated Oct. 5, 2007, 3 Pages.
"Office Action Issued in Indonesian Patent Application No. P00201401364", dated Jul. 4, 2018, 4 Pages.
"Office Action Issued in Korean Patent Application No. 10-2007-0080691", dated Dec. 31, 2010, 4 Pages.
"Office Action Issued in Korean Patent Application No. 10-2011-0029927", dated May 30, 2011, 7 Pages.
"Office Action Issued in Korean Patent Application No. 10-2014-7006256", dated Jun. 14, 2018, 6 Pages.
"First Action Interview—Office Action Issued in U.S. Appl. No. 11/182,251", dated Nov. 6, 2008, 4 Pages.
"First Action Interview—Office action Issued in U.S. Appl. No. 11/182,989", dated Nov. 6, 2008, 10 Pages.
"Final Office Action Issued in U.S. Appl. No. 14/834,959", dated Jun. 28, 2018, 18 Pages.
"Office Action Issued in Colombian Patent Application No. 1449366", dated Jun. 19, 2015., 21 Pages.
"Second Office Action Issued in Chinese Patent Application No. 201280032570.8", dated Aug. 24, 2016, 8 Pages.
"Office Action Issued in Russian Patent Application No. 2013126471", dated Nov. 12, 2015, 6 Pages.
"Office Action Issued in South African Patent Application No. 2014/01381", dated Mar. 27, 2015, 1 Page.
"First Office Action and Search Report Issued in Chinese Patent Application No. 201610207685.6", dated Jul. 4, 2018, 12 Pages.
"Office Action Issued in Indian Patent Application No. 3305/DEL/2005", dated Mar. 28, 2013, 2 Pages.
"Office Action Issued in Chilean Patent Application No. 539-2014", dated Jun. 11, 2015., 7 Pages.
"Office Action Issued in Chilean Patent Application No. 539-2014", dated Oct. 8, 2015, 6 Pages.
"Office Action Issued in Mexican Patent Application No. MX/a/2014/002782", dated Oct. 10, 2016, 4 Pages.
"Office Action Issued in Mexican Patent Application No. MX/a/2014/002782", dated Feb. 9, 2016, 4 Pages.
"Office Action Issued in Indian Patent Application No. 9850/CHENP/2013", dated Oct. 29, 2018, 6 Pages.
"Notice of Allowance in Korean Patent Application No. 10-2014-7006137", dated Nov. 15, 2018, 5 Pages.
"Non-Final Office Action issued in U.S. Appl. No. 14/834,959", dated Mar. 7. 2019, 15 Pages.
"Office Action Issued in Korean Patent Application No. 10-2013-7034797", dated Jan. 21, 2019, 7 Pages.
"Office Action Issued in European Patent Application No. 17165513.7", dated Feb. 1, 2019, 6 Pages.
"Final Office Action issued in Chinese Patent Application No. 201610207685.6", dated Feb. 3, 2019, 5 Pages.
"Office Action Issued in Chinese Patent Application No. 201610903829.1", dated Jan. 8, 2019, 12 Pages.

* cited by examiner

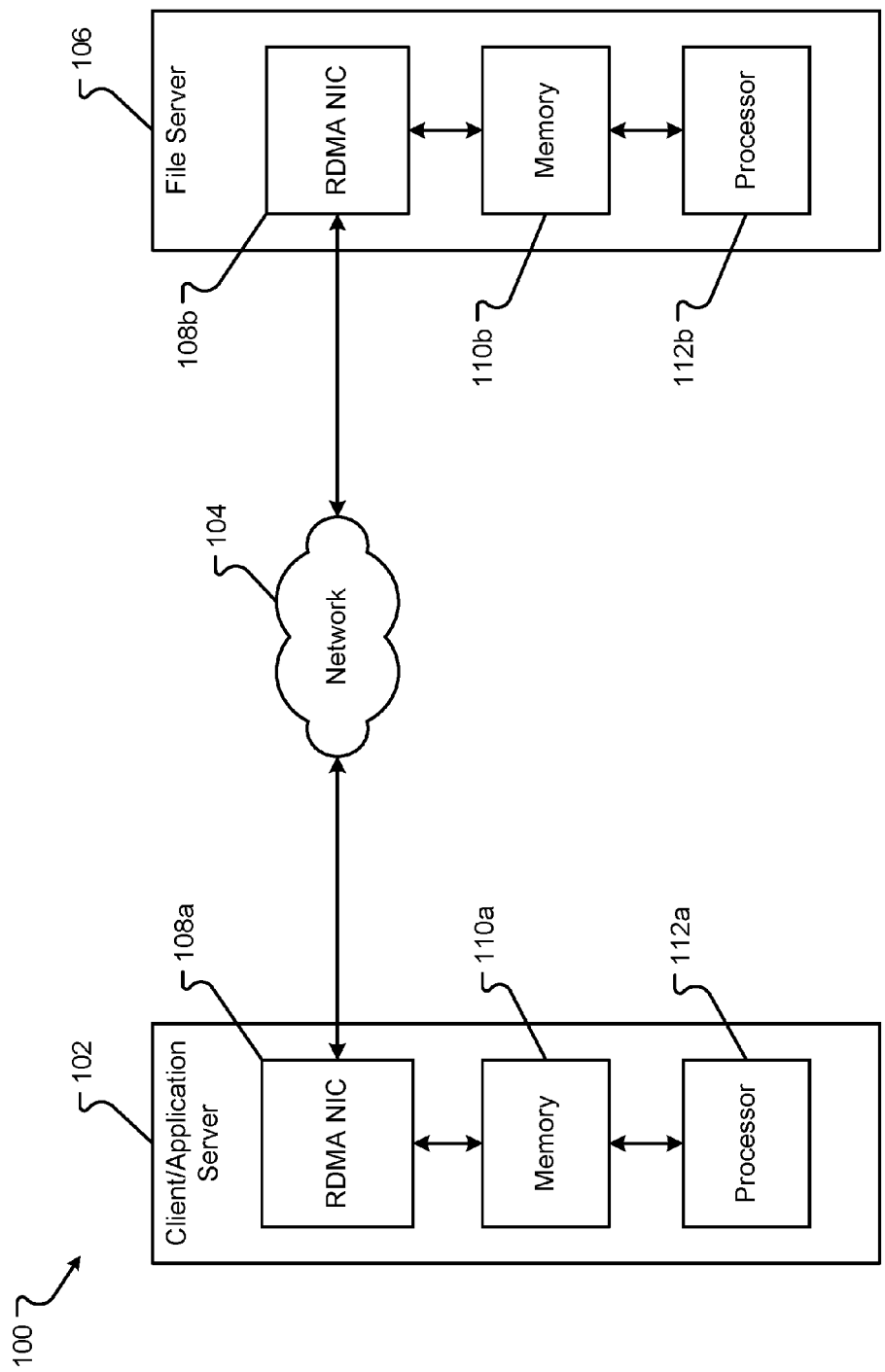

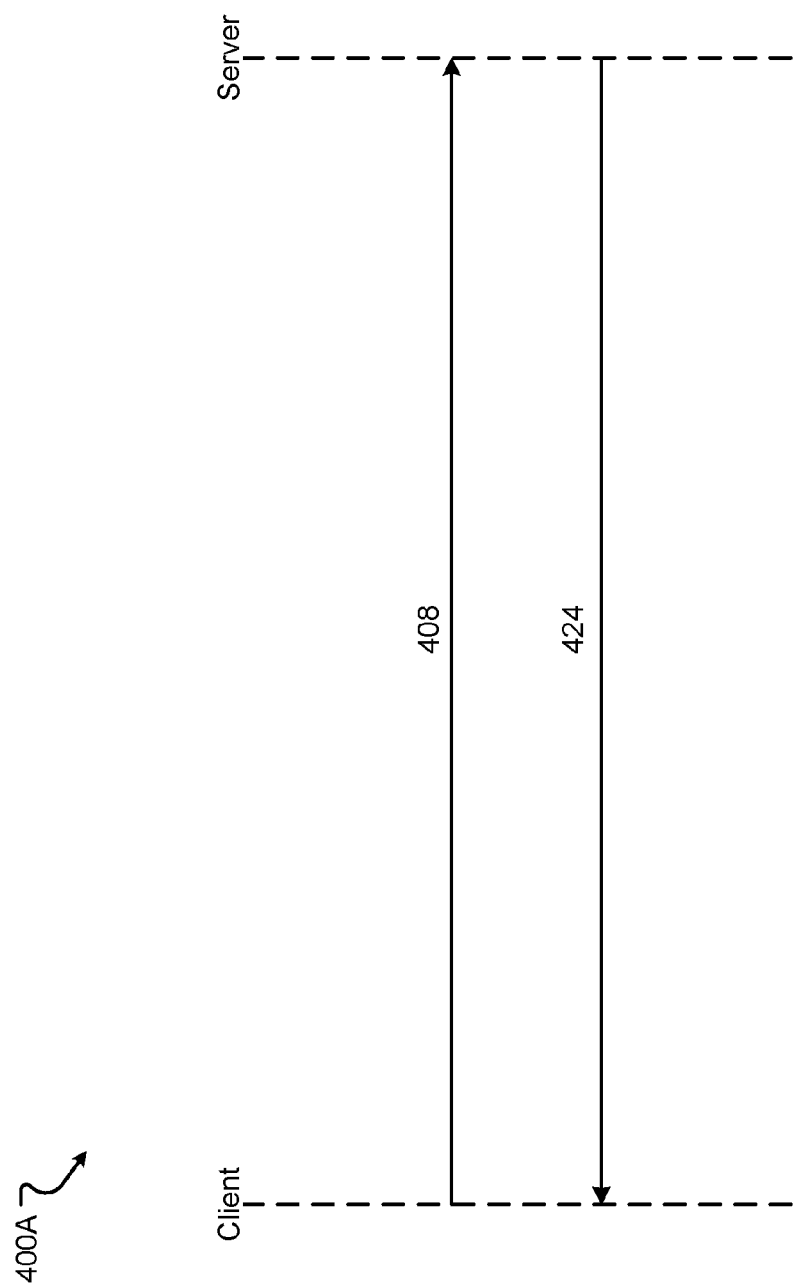

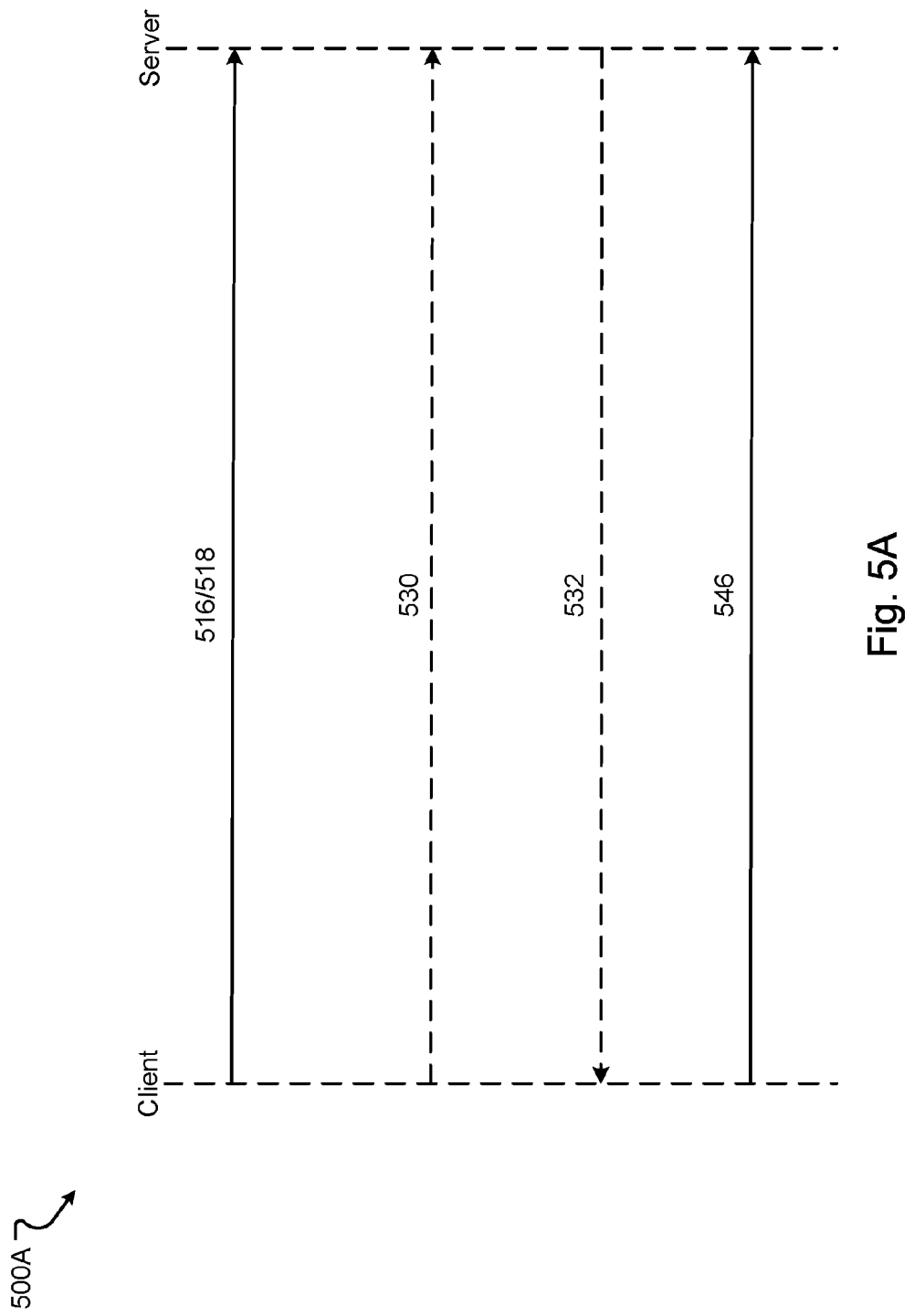

TRANSPORTING OPERATIONS OF ARBITRARY SIZE OVER REMOTE DIRECT MEMORY ACCESS

CROSS-REFERENCE TO RELATED APPLICATIONS

This application is a continuation of U.S. patent application Ser. No. 13/172,757, issued as U.S. Pat. No. 9,331,955, filed on Jun. 29, 2011, and entitled, "TRANSPORTING OPERATIONS OF ARBITRARY SIZE OVER REMOTE DIRECT MEMORY ACCESS." The entirety of the above-listed Application is incorporated herein by reference. To the extent appropriate, a claim of priority is made to the above-recited application.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright.©. 2011, Microsoft Corp.

BACKGROUND

File access protocols, such as Server Message Block (SMB) or versions thereof, e.g., SMB2, may operate as application-layer network protocols mainly used to provide shared access to files and miscellaneous communications between nodes on a network. Historically, SMB or SMB2 operated atop transmission control protocol (TCP) transports and traditional network infrastructure. While SMB2 has been very successful as a protocol for general purpose remote file access, SMB2 has not been widely adopted for remote file access where high throughput and low latency file input/output is required.

Remote Direct Memory Access (RDMA) is a direct memory access from the memory of one computer into that of another computer without involving the operating system of the other computer. This direct transfer permits high-throughput, low-latency data transfers over a network, which is especially useful in performance-critical deployments. When an application performs an RDMA Read or Write request, the application data are delivered directly from a source memory buffer to a destination memory buffer using RDMA-capable network adapters, which do not involve the central processing unit (CPU) (also referred to simply as a processor) or operating system in the transfer. These RDMA transfers reduce latency and enable fast message transfer. Unfortunately, the benefits of RDMA have not been exploited by systems using SMB2 because SMB2 has not operated with RDMA.

Although specific problems have been addressed in this Background, this disclosure is not intended in any way to be limited to solving those specific problems.

SUMMARY

Embodiments generally relate to a protocol and processing to implement data operations, such as SMB2 operations (or other versions of SMB operations or file access protocol operations, for example), atop RDMA transports. In embodiments, the protocol definition specifies new messages for negotiation of an RDMA connection and for transferring SMB2 data, for example, using the negotiated connection. In an embodiment, a protocol for implementing SMB2 operations atop RDMA transports is the SMB Direct protocol. However, other embodiments provide for other SMB protocols, SMB protocol versions, or other data operation protocols without departing from the spirit and scope of the present disclosure. According to an embodiment, a new SMB Direct message may include new header information, which may include, but is not limited to, one or more of the following: CreditsRequested, CreditsGranted, Flags, Reserved, RemainingDataLength, DataOffset, and DataLength. The header information is used because RDMA transports support receiving messages of a size fixed only by the receiver, and SMB2 message size can vary widely from about a hundred bytes to very large messages over a million bytes. The SMB2 protocol is modified to recognize the existence of the RDMA capability, while the SMB Direct protocol adds a new layer to the networking stack to allow multiple individual RDMA messages to be logically concatenated into a single request or response to accommodate both the fixed size restrictions on RDMA messages and the indeterminate size requirements inherent to SMB2 messaging. The changes to the SMB2 protocol and the addition of the SMB Direct protocol allow for the direct transfer of data between memories of the peers. In embodiments, the SMB2 server may read from or write to a client's memory using RDMA to perform direct placement of data. The server performs an RDMA Write to the client to complete an SMB2 read and performs an RDMA Read to complete an SMB2 write. While the SMB Direct protocol allows for the direct transfer of SMB/SMB2 data between memories of peers, the SMB Direct protocol may be adapted to other protocols, according to embodiments. According to embodiments, the bi-directional, peer-to-peer nature of the SMB Direct protocol lends itself to numerous types of data transfer operations.

RDMA transports also restrict the number of messages which may be processed at any time, again with a value fixed only by the receiver. To conform to this requirement of RDMA, embodiments provide for the peers to exchange or assign "credits," which are numeric values, requested by and granted to each mutual peer, in the protocol header that specify the number of RDMA messages the sender may send to the receiver. Credits are dynamic and are managed independently by each peer. Rules for managing and making sufficient credits available to perform SMB2 exchanges are defined by the protocol in embodiments disclosed herein.

In embodiments, the provision of independent, bidirectional credits may permit each peer to send requests and responses without explicit negotiation or prior knowledge and agreement by the receiving peer. Sequenced sends, associated with RDMA, may permit the exchange of unexpectedly large messages without invoking errors in the RDMA processing and without resorting to less efficient negotiated transfers when such conditions arise.

Additional messages may be used for negotiation of the protocol version and other parameters, according to embodiments. A Negotiate Request message may include, for example, fields for CreditsRequested, Reserved, MinVersion, MaxVersion, OutboundSendSize, MaxInboundSendSize, etc. In turn, a Negotiate Response message sent in response to the request message may include, for example, fields for CreditsRequested, CreditsGranted, Version, Reserved, Status, OutboundSendSize, InboundSendSize, etc. These parameters support the negotiation of capabilities, end-to-end optimization of resources, and compatibility with future enhanced versions of the protocol.

This Summary is provided to introduce a selection of concepts in a simplified form that is further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

Embodiments of the present disclosure may be more readily described by reference to the accompanying drawings in which like numerals refer to like items.

FIG. 1 illustrates an example logical representation of an environment or system for exchanging SMB2 messages over RDMA, in accordance with embodiments of the present disclosure.

FIGS. 4A-4C depict a flow diagram illustrating the operational characteristics of a process for negotiating a communication using SMB2 over RDMA, in accordance with embodiments of the present disclosure.

FIGS. 5A-5D show a flow diagram illustrating the operational characteristics of a process for exchanging data using SMB2 over RDMA, in accordance with embodiments of the present disclosure.

DETAILED DESCRIPTION

Figure 2A:
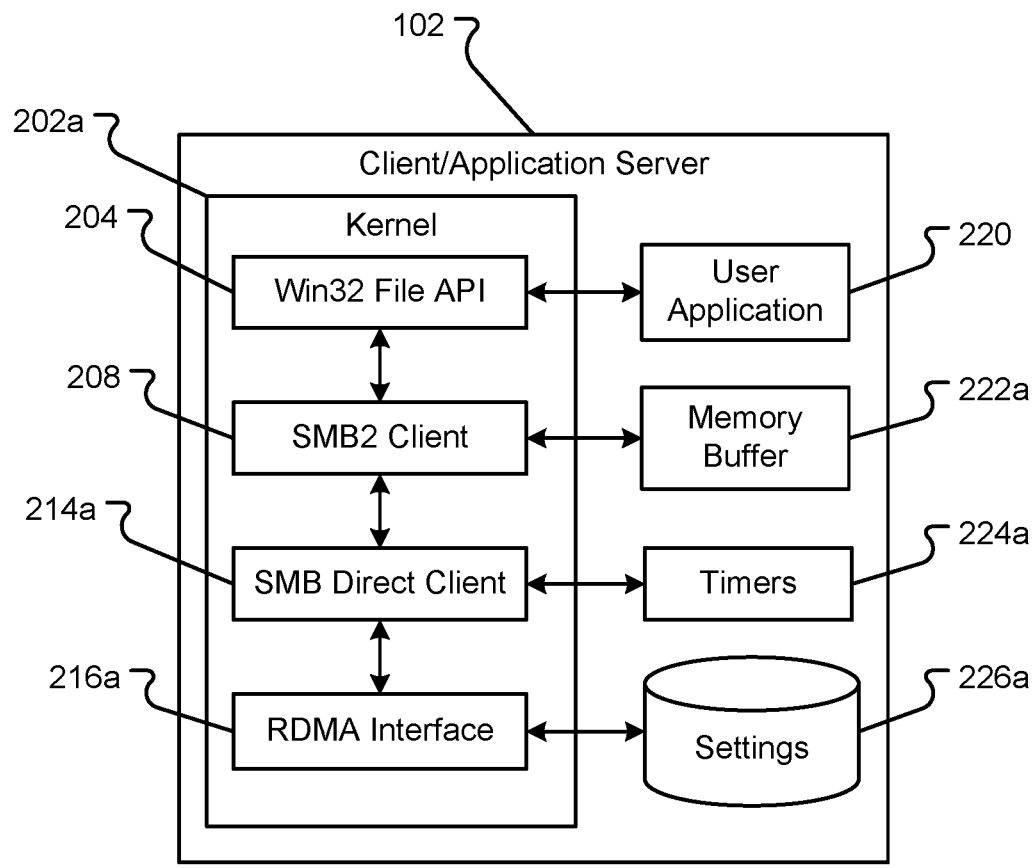
FIG. 2A depicts an example logical representation of a client system for sending SMB2 messages over RDMA, in accordance with embodiments of the present disclosure.

This disclosure will now more fully describe example embodiments with reference to the accompanying drawings, in which specific embodiments are shown. Other aspects may, however, be embodied in many different forms, and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations.

Embodiments generally relate to systems, methods, and protocols for exchanging SMB2 data over an RDMA connection. RDMA provides advantages in transporting data. For example, RDMA makes transfers from one memory to another device's or system's memory. These transfers do not involve the processor and, thus, reduce the overhead involved in transporting data. Further, without the involvement of a processor in transport management, RDMA transmits data with fewer clock cycles. Thus, RDMA provides a low-latency, high bandwidth connection.

In general, a version of SMB, such as SMB2, is an application-layer network protocol used to provide shared access to files and miscellaneous communications between nodes on a network. SMB and SMB2 are thus examples of file access operation protocols. SMB2 allows for the transfer of data in the exchange of messages between a client(s) and a server(s). The description of some embodiments herein refers to SMB2. However, in other embodiments, any version of SMB or other file access operation protocol may be used without departing from the spirit and scope of the present disclosure.

Due, generally, to differences in operation, SMB2 (or SMB) does not currently operate over RDMA but, instead, uses TCP to transport data. The present embodiments create a system and protocol for exchanging SMB2 messages over an RDMA-capable network protocol. First, a client and/or a server, which may be collectively referred to as peers, discover the capabilities or abilities of each other using a component of SMB2. In an embodiment, a request is sent by the client asking for information about the server. The responding server may reply with information about the number of network interface cards (NICs) the server has, the internet protocol (IP) address for the NICs, the speed of the NICs, whether the NICs are RDMA capable, and/or possibly an IP address. In embodiments, the asking client may use this information to determine how to interface with the server.

If a server is RDMA capable, an RDMA-capable client may then negotiate an RDMA connection with that server, according to embodiments of the present disclosure. A new interface, referred to as the RDMA interface in embodiments, is an interface between a RDMA-capable network adapter and the other system components (including an SMB client). Further, a new module is added to the stack called an SMB Direct client/server. First, the SMB Direct client, possibly in response to the capabilities request, pre-posts a receive by reserving at least a portion of a memory buffer to receive a message from the other peer. The SMB Direct client may then send an SMB Direct Negotiate Request packet. An SMB Direct Negotiate Request begins a process of establishing an SMB Direct connection between the peers. According to embodiments, the SMB Direct Negotiate Request includes one or more fields that define how the RDMA connection will function.

In embodiments, part of the SMB Direct Negotiate Request is a request for "credits." Credits are an allotment of space in the receiving peer's memory buffer. As RDMA transfers directly from one memory to another memory, the receiving peer reserves space in a memory buffer where the sending peer may place transported data. The memory buffers are allotted in blocks (e.g., 1 Kbyte blocks). In embodiments, the allotments are set in that the block size does not change after the SMB Direct connection has been established. In other embodiments, the allotments are not set, in which the block size may change. Where the allotments are set, any transfer to the memory buffer may not exceed the block size. To transfer SMB2 data having a size greater than the block size, the sender sends two or more packets that are stored into two or more allotments of the memory buffer. To reserve the memory allocations, the sending peer requests credits, where the number of credits requested may be governed by a local policy and is not necessarily affected by the composition of the message. Each credit represents a block of the memory buffer and, thus, represents a message the requester may send to the other peer.

In embodiments of the present disclosure, the server may send a response, e.g., an SMB Direct Negotiate Response, to the requester. This SMB Direct Negotiate Response also includes various fields that define the RDMA connection. In response to the request, the SMB Direct Negotiate Response provides a number of credits to the client. Further, the SMB Direct Negotiate Response may also ask for credits that reserve an allocation in the client's memory buffer. The exchange of the SMB Direct Negotiate Request and SMB Direct Negotiate Response, in embodiments, establish the RDMA connection. Thereafter, SMB2 data may be exchanged over the connection.

According to embodiments, the exchange of SMB2 data over the RDMA connection includes the transport of at least one packet. If the SMB2 data being sent is smaller than the block size, only one packet, called an SMB Direct Data Transfer packet, may be sent. However, if SMB2 data to be sent is larger than the block size, two or more SMB Direct Data Transfer packets may be sent, according an embodiment. RDMA allows for the sequenced reception of packets. Thus, a second packet received in a communication will be placed directly after a first received packet. To utilize this advantage of RDMA, the SMB Direct Data Transfer packets include fields to announce the total amount of SMB2 data to be sent and how much data are left to be sent after the present packet. In this way, the SMB Direct peers may determine when an SMB transfer is completed, and the SMB2 data may be reassembled. The SMB Direct Protocol, therefore, provides in embodiments for quick transfers of SMB2 data with low latency and low overhead, while overcoming the issues associated with transferring SMB2 data over RDMA.

An example logical environment or system 100 for exchanging SMB2 data over an RDMA connection is shown in FIG. 1, according to embodiments disclosed herein. Connection peers (referred to also as client 102 and server 106) 102 and 106 may move SMB2 data across an RDMA connection between RDMA NICs (RNICs) 108*a* and 108*b* over network 104. A connection peer may be any computer system as described with respect to FIG. 7, for example. The connection peers are shown as a client/application server 102 and a file server 106 in FIG. 1. However, these peers are offered by way of example only. Any type of client(s) or server(s) may function as a connection peer in the embodiments. Thus, RDMA connections may be between multiple clients, multiple servers, a server farm(s), a server cluster(s), a message server(s), or between a client(s) and a server(s), for example. The client/application server 102 and file server 106 are offered as examples only for purposes of understanding the teachings of the embodiments disclosed herein.

Figure 7:
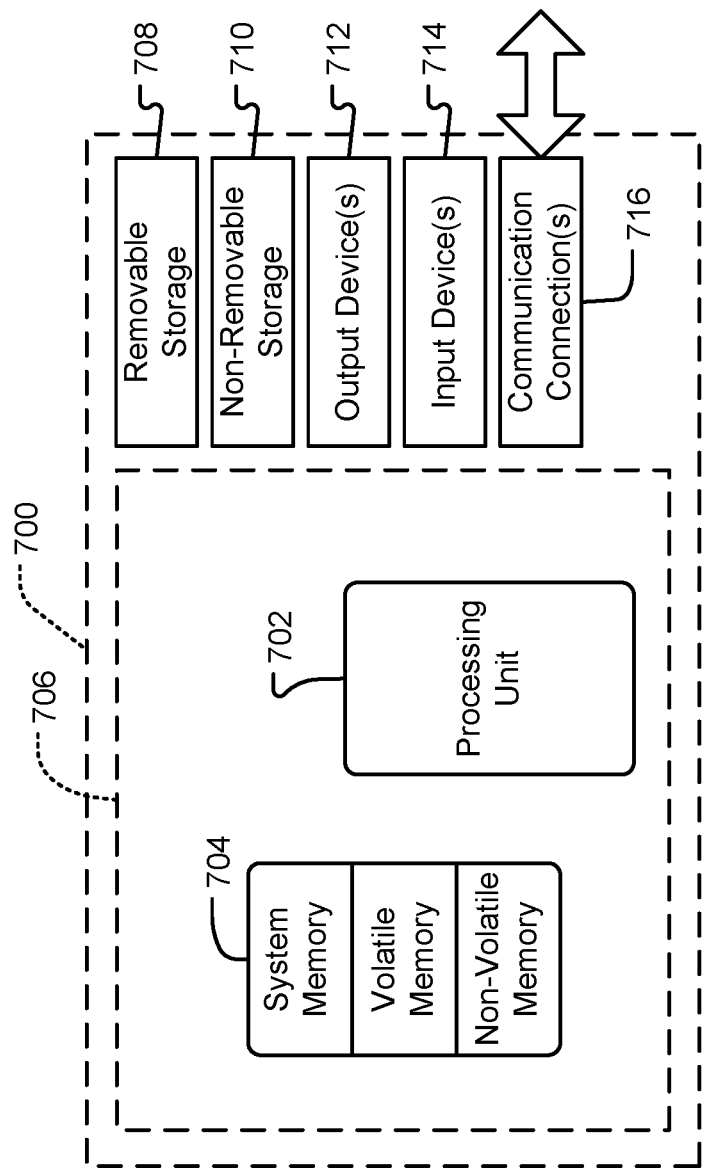
FIG. 7 depicts an example computing system upon which embodiments of the present disclosure may be implemented.

While SMB2 data are moved over network 104, the network 104 may be as described with respect to FIG. 7, for example. Network 104, although shown as an individual single network, may be any type of network conventionally understood by those of ordinary skill in the art. In accordance with an embodiment, the network may be the global network (e.g., the Internet or World Wide Web, i.e., "Web" for short). It may also be a local area network, e.g., intranet, or a wide area network. In accordance with embodiments, communications over network 104 occur according to one or more standard packet-based formats, e.g., H.323, IP, Ethernet, and/or ATM.

Further, in embodiments, an RNIC 108 (*a* and/or *b*) may be any network interface card, network adapter, and/or network interface controller that supports RDMA. There are several vendors that offer RNICs. iWARP or InfiniBand, for example, are network protocols that support RDMA. The RNICs may support RDMA, which allows direct transfers of data from memory 110*a* to memory 110*b* and vice versa. These transfers of data do not require or include the oversight of the processor 112*a* or 112*b*. Thus, the RDMA transfers are high-bandwidth, low latency, and low overhead, according to embodiments of the present disclosure. The processors 112 and memories 110 may be as described with respect to FIG. 7, for example.

While FIG. 1 illustrates a general environment for SMB2 data exchanges over RDMA, FIG. 2A depicts an example peer 102 for sending or receiving the SMB2 data over the RDMA connection, according to embodiments disclosed herein. In this example, the peer 102 is a client and/or application server. The various components of the client 102 may include software and/or hardware, according to embodiments of the present disclosure. However, for purposes of illustration, the components hereinafter will be described as software modules. In embodiments, the client 102 includes one or more of, but is not limited to, a kernel 202*a*, at least one user application 220, a memory buffer 222*a*, one or more timers 224*a*, and/or one or more settings 226*a*. In embodiments, a "kernel" is the core of an operating system, in which memory, files, and peripheral devices are managed, applications are triggered and launched, and system resources are allocated.

In embodiments, the kernel 202*a* may include one or more of, but is not limited to, a WIN32® File application programming interface (API) or equivalent 204, an SMB2 module (shown as an SMB2 Client 208), an SMB Direct module (shown as an SMB Direct Client 214*a*), and a RDMA Interface 216*a*. The SMB Direct module and the RDMA Interface 216*a* are introduced to perform the methods and processes described herein. The modules, components, and/or interfaces will be described as follows.

In embodiments, the WIN32® File API 204 may be an interface between the kernel 202*a* and one or more user applications 220. In an example embodiment, the WIN32® File API 204 is a set of APIs available in the MICROSOFT WINDOWS® operating systems. Almost all WINDOWS® programs interact with the WINDOWS® API to perform functions. Embodiments of the WIN32® File API 204 provide access to the resources available to a WINDOWS® system, such as, for example, file systems, devices, and/or error handling. WIN32® File API 204 may provide access to functionality additional to the kernel, according to embodiments. In embodiments, WIN32® File API 204 additionally allows a system to perform actions on remote files that use underlying file access functions that, in turn, use various networking capabilities and allow for remote access.

In embodiments, the SMB2 Client 208 manages the communication between applications and the interfaces provided by the SMB2 Server 212*b*. Because devices may operate at speeds that may not match the operating system, the communication between the operating system and device drivers is primarily done through I/O request packets (IRPs). These packets are similar to network packets or WINDOWS® message packets, for example. The packets are passed from an operating system(s) to specific drivers and from one driver to another. In embodiments, the SMB2 Client 208 may redirect the I/O requests to network resources and compose SMB messages to conduct the communications over the network. The SMB2 Client 208 communicates the SMB packets to the SMB Direct Client 214*a* to exchange the SMB packets or data over RDMA. Similarly, the SMB2 Server 212*b* can also use IRPs to send file requests from the SMB2 Client 208 to the server's storage, according to an embodiment.

In embodiments, the SMB Direct Module 214 is an instance created from the SMB Direct network provider interface (NPI) in the kernel 202. The SMB Direct Module 214 exposes an API (referred to as the SMB Direct NPI) to the SMB2 client and SMB2 server modules. The SMB2 client/server modules use this SMB Direct NPI to make requests to send or receive data over an SMB Direct connection. The SMB Direct module 214 implements the SMB Direct Protocol and sits between the SMB2 client/server modules and the underlying RDMA interface, according to embodiments. The SMB Direct NPI enables the SMB Direct protocol. The SMB Direct NPI may create and destroy SMB Direct connections, send and receive data over SMB Direct connections, register/unregister memory, perform RDMA Read/Write data operations from/to a peer over a SMB Direct connection, receive notifications when an SMB Direct connection is disconnected by the peer, marshal/unmarshal SMB2 packets for transmission across a SMB Direct connection, among other operations. To accomplish these tasks, an SMB Direct Module 214 is created that may manage the sending and retrieving of the SMB2 data from the memory buffers 222 as stored by the RDMA protocol. Thus, the SMB Direct Module 214 converts data from simply SMB2 data into RDMA and back from RDMA to SMB2. The SMB Direct Module 214 communicates with another new module, the RDMA Interface 216 to execute the operations in embodiments of the present disclosure.

According to embodiments, the SMB Direct Module 214 performs several functions. An SMB DirectReceiveEvent callback function notifies SMB2 Client 208 or SMB2 Server 212*b* that a message has been received on a SMB Direct endpoint. An SMB DirectDisconnectEvent event callback function notifies SMB2 Client 208 or SMB2 Server 212*b* that a connection on an endpoint has been disconnected. An SMB DirectAcceptEvent event callback function notifies the SMB2 Server 212*b* that an incoming connection on a listening endpoint has been accepted. An SMB DirectListen function creates a listener endpoint that listens for incoming connections on a given local address. An SMB DirectCloseEndpoint function closes an endpoint and frees any associated resources. An SMB DirectConnect function connects an endpoint to a remote SMB Direct transport address. An SMB DirectDisconnect function disconnects an endpoint from a remote SMB Direct transport address. An SMB DirectSend function sends a buffer of data to a remote SMB Direct peer. An SMB DirectRegisterMemory function allows the SMB2 Client 208 to register memory buffers for use in RDMA Read/Write operations. An SMB DirectUnregisterMemory function unregisters memory buffers that were previously registered via the SMB DirectRegisterMemory API. An SMB DirectRdmaRead function causes RDMA to read data directly from the memory of the remote peer to which the endpoint is connected. An SMB DirectRdmaWrite function causes RDMA to write data directly into the memory of the remote peer to which the endpoint is connected. These functions and the operation thereof will be explained in conjunction with FIG. 6.

In an embodiment, the RDMA Interface 216 is a new interface to interface with the vendor-specific RDMA functionality of the RNICs. The RDMA Interface 216 can give access to the functions of the RDMA device. The functions of the RDMA device can include listening to a port to receive SMB Direct packets and provide the SMB2 data to the SMB Direct Module 214. In an embodiment, the RDMA device may include a kernel mode RDMA module to manage communications over the RDMA connection. Further, the RDMA device may include an RDMA access layer and Extensions to access and listen on a port sending RDMA messages. A proxy driver may interface with the hardware driver of the RNIC, according to embodiments.

In embodiments, the user application 220 may be any software executed by a processor for a user or other software. Examples of user applications 220 include web browsers, email, etc. These user applications 220 interface with the kernel 202*a* to send and receive data, especially from remote storage locations, such as the file server 106.

In an embodiment, a memory buffer 222 may be any type of memory, as described with respect to FIG. 7. The memory buffer 222 may be used to receive SMB Direct messages and/or SMB2 data carried in the messages and may be used to stage outgoing SMB Direct messages before transmitting those messages. Thus, the memory buffer 222 may be partitioned into blocks as described hereinafter, according to embodiments.

The timers 224, in embodiments, are a set of clocks that may count down from a predetermined time to zero. Thus, the timers 224 represent stored data and a clock function executed by a processor. Expiration of a timer 224 may trigger one or more functions in the RDMA Interface or with the SMB Direct Module 214. In other embodiments, the timers may count from zero to a threshold or perform some other type of counting. Some of the timers may include a SendCreditGrantTimer, which is the timer that is started when SendCreditCount reaches zero and operates in the timers section 224. The remotely connected peer has until this timer expires to grant additional Send Credits. The SendCreditGrantTimer can also regulate the amount of time that the client/server waits for the peer to grant it additional Send Credits. When the client/server finds that it cannot send a packet to the peer because the value of SendCreditsCount is zero, then the client/server sets a timer that will expire in a predetermined number of seconds, according to embodiments. If the timer expires before a Send Credit becomes available, the client/server disconnects the connection. In an embodiment, an Idle Connection Timer regulates the amount of time that the client/server waits for the peer to send a packet. If no packets have been received from the peer in the last predetermined number of seconds, the client/server sends a keep alive request to the peer and sets a KeepAliveResponse timer. If no response is received before the expiration of the KeepAliveResponse timer, then the connection is disconnected, according to embodiments of the present disclosure.

A KEEPALIVE_REQUESTED flag may also be set for any SMB Direct Data transfers over the SMB Direct Connection, according to embodiments of the present disclosure. In an embodiment, the KEEPALIVE_REQUESTED flag is a request for the receiving peer to respond to the sender as soon as possible so that the sender knows that the receiver is still connected and responsive. One or more systems may try to time out the connection without a message exchange. Thus, a message with the KEEPALIVE_REQUESTED flag can maintain the connection. In alternative embodiments, a message with the KEEPALIVE_REQUESTED flag set can be used to request or receive credits.

In an embodiment, a settings 226 store stores and retrieves data relevant to exchanging SMB messages over RDMA. The settings 226 may be stored in any type of memory or storage devices as described with respect to FIG. 7. As an example, the settings may include how many seconds after being set does the Credit Replenishment Timer expire, what is the maximum sized SMB Direct Data Transfer packet that the peer is willing to receive from another peer, or what is the limit on the number of send credits the peer will grant to another peer, etc.

The SMB_DIRECT_ENDPOINT Structure may be an opaque structure that represents a SMB Direct endpoint, in embodiments. An SMB Direct endpoint is analogous in function to a network socket, for example. SMB2 Client 208 or SMB2 Server 212*b* may not access the members of this structure directly but through the SMB Direct Module 214, according to an embodiment. The SMB_DIRECT_ENDPOINT Structure may include data for several operations. MwReleaseList is a list of memory windows that may be released back to the remotely connected peer. These memory windows are associated with RDMA Read/Write operations that have completed. ReceiveCreditCount is the number of Receive Credits that are to be granted to the remotely connected peer. The endpoint's host may have at least this number of receives pending on the endpoint. SendCreditCount is the number of Send Credits that the endpoint's host currently has. The remotely connected peer may have at least this number of receives pending on their endpoint. PendingRdmaReadCount is the number of RDMA Read operations that have been initiated but not yet completed on this endpoint. PendingRdmaReadLimit is the maximum number of RDMA Read operations that may be simultaneously pending on the endpoint. DeferredInitiatorOpQueue is a queue of initiator operations that are deferred because the endpoint resources to issue them are not currently available, in embodiments. NdkQp is the queue pair object that represents the receive and initiator request queues. NdkReceiveCq is the NDK receive completion queue. Receive request completions are queued to this queue. NdkReceiveQueueCapacity is the maximum number of Receive requests that may be simultaneously pending on the endpoint. NdkInitiatorCq is the NDK initiator completion queue. Send, Bind, Fast-Register, Read, Write, and Invalidate request completions are queued to this queue, for example. In embodiments, NdkInitiatorQueueCapacity is the maximum number of Send, Bind, Fast-Register, Read, Write, and Invalidate requests that may be simultaneously pending on the endpoint.

Figure 2B:
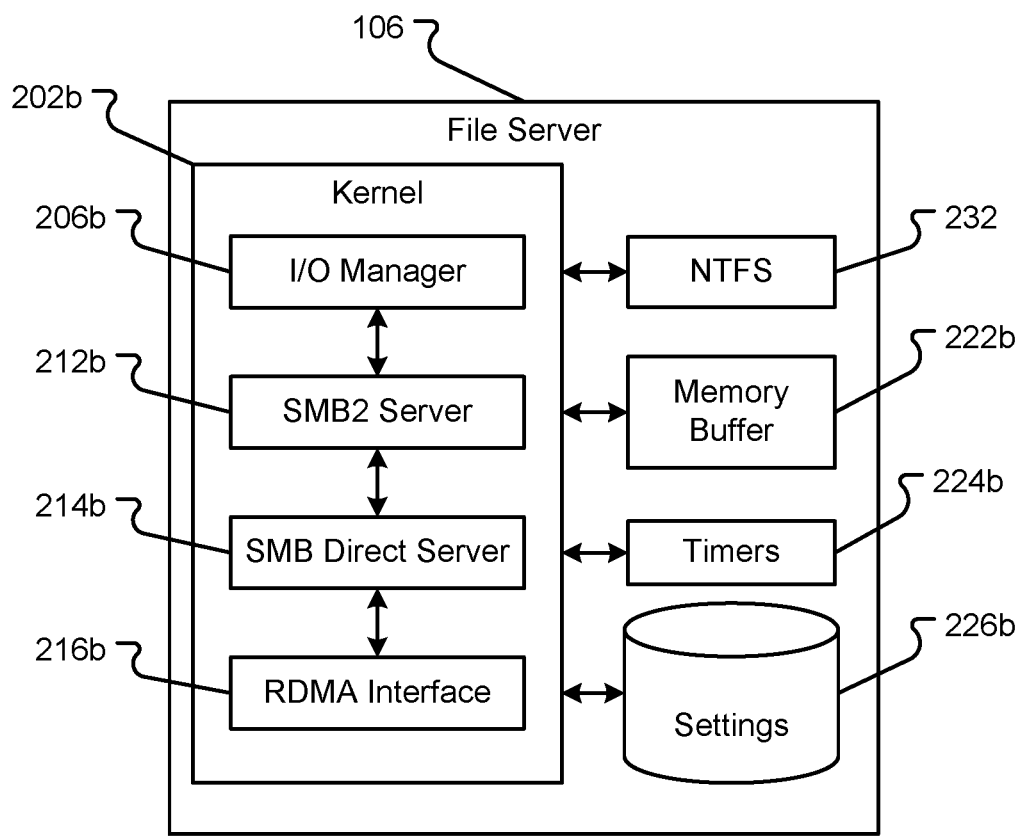
FIG. 2B illustrates a logical representation of a server system for receiving SMB2 messages over RDMA, in accordance with embodiments of the present disclosure.

FIG. 2B depicts an example peer 106 for sending or receiving the SMB2 data over the RDMA connection, in accordance with embodiments disclosed herein. In this example, the peer 106 is a file server. The various components of the file server 106 may include software and/or hardware. While embodiments describe the components as software modules, other embodiments provide for other types of modules. In embodiments, the file server 106 includes one or more of, but is not limited to, a kernel 202*b*, an NTFS 232, a memory buffer 222*b*, one or more timers 224*b*, and/or one or more settings 226*b*. Some of these functions are the same or similar to those described in FIG. 2A.

According to embodiments, the kernel 202*b* (and/or as described with respect to FIG. 2A) may include one or more of, but is not limited to, an input/output (I/O) manager 206*b*, an SMB2 Server 212*b*, a SMB Direct Server 214*b*, and an RDMA Interface 216*b*. Some of these functions are the same or similar to those described in FIG. 2A.

In embodiments, SMB2 Server 212*b* is a driver that implements the server side of the SMB2 protocol for MICROSOFT® servers. Other embodiments provide for other types of servers. SMB2 Server 212*b* may start and exchange data using SMB and supply the data or receive the data from the I/O Manager 206*b*. In embodiments, SMB2 Server 212*b* sends or receives the SMB2 data over a network connection. SMB2 Server 212*b* functions to communicate over networks for the server. Thus, SMB2 Server 212*b* provides the SMB2 data for transmission or receives the SMB2 data from a network transmission, according to embodiments.

In embodiments, the New Technology File System (NTFS) 232 may be a standard file system. NTFS includes support for metadata and the use of advanced data structures to improve performance, reliability, and disk space utilization, plus additional extensions such as security access control lists (ACL) and file system journaling. NTFS functions to organize and store file data for one or more clients. This file data may be provided to the client over communications with the client, such as SMB2 data transfers over RDMA.

According to embodiments, SMB Direct creates an RDMA connection to exchange SMB2 data. The protocol creates the RDMA connection through a negotiation process. After the peers 102 and 106 negotiate the RDMA connection, either peer 102 or 106 may send SMB2 data over the RDMA connection.

Figure 3A:
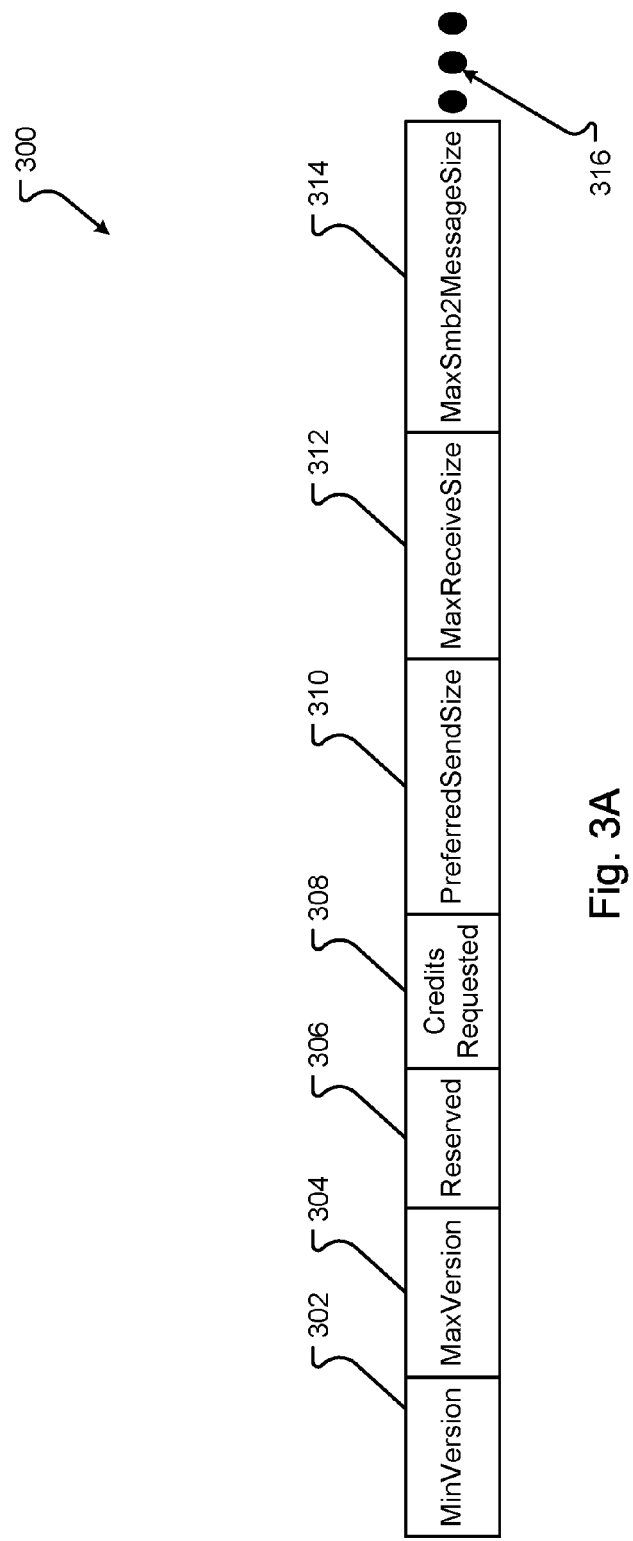
FIGS. 3A-3E show logical representations of messages sent or received when exchanging data using SMB2 messages over RDMA, in accordance with embodiments of the present disclosure.
Figure 3B:
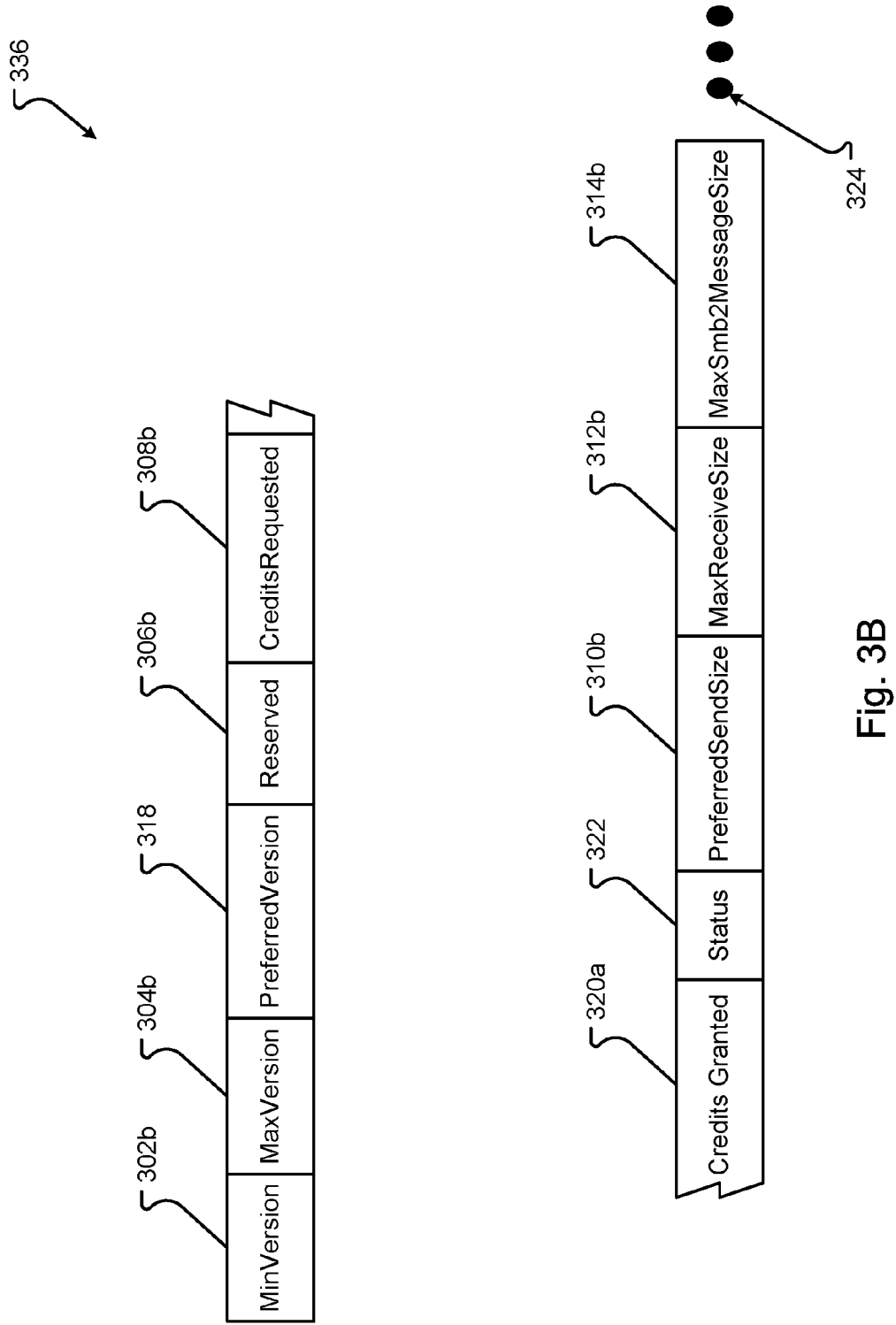
Figure 3C:
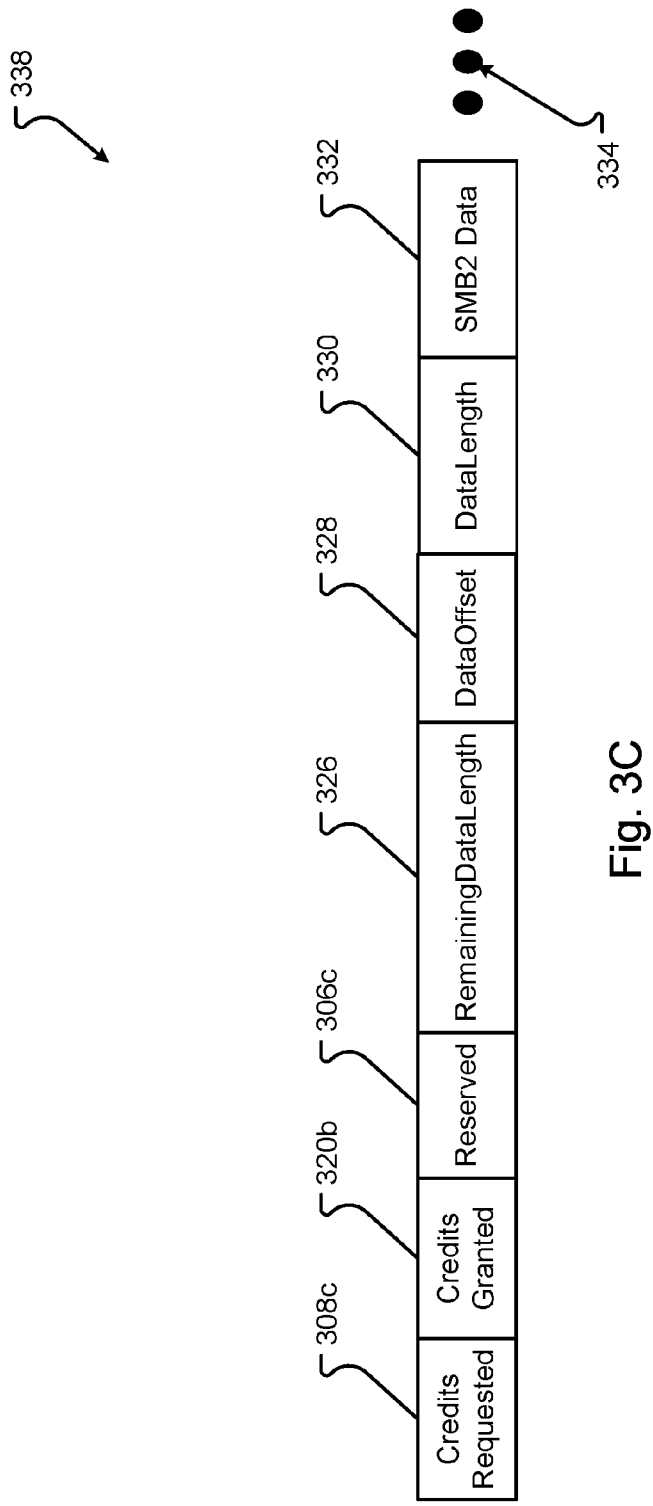

According to embodiments, a first SMB Direct Negotiate Request packet 300 is shown in FIG. 3A. In turn, the associated SMB Direct Negotiate Response packet 336 is shown in FIG. 3B, in embodiments. Further, the SMB Direct Data Transfer packet 338 used to transfer data is shown in FIG. 3C, according to embodiments. Each message or packet may be created, transmitted, stored, and/or received, for example. The packets or messages may each include portions or fields that store different data, in embodiments.

Turning to FIG. 3A, an SMB Direct Negotiate Request packet 300 is shown, according to embodiments of the present disclosure. The SMB Direct Negotiate Request packet 300 may include one or more of, but is not limited to, the following fields, for example: MinVersion 302, MaxVersion 304, Reserved 306, CreditsRequested 308, PreferredSendSize 310, MaxReceiveSize 312, and/or MaxSMB2MessageSize 314. The SMB Direct Negotiate Request packet 300 may include additional or fewer fields than those shown in FIG. 3A, as represented by ellipses 316.

In an embodiment, the MinVersion field 302 may include a value for the lowest SMB Direct Protocol version that the client/requester 102 supports. The MaxVersion field 304 may store the highest SMB Direct Protocol version that the client/requester 102 supports. This value may be equal to or greater than the value of the MinVersion field 302. In embodiments, the client/requester supports all of the protocol versions (inclusive) in the range between the value in the MinVersion field 302 and the value in the MaxVersion field 304. The Reserved field 306 is simply a reserved field for future unknown requirements and is not used by the client, according to an embodiment.

The CreditsRequested field 308, according to embodiments, comprises a value for the number of send credits that the client/requester 102 is requesting from the server/receiver 106. In embodiments, the value in the CreditsRequested field 308 is greater than zero (0) to ensure that the SMB2 data may be sent in a subsequent message. However, the value in the CreditsRequested field 308 may be any number and may be set based on an average usage, according to embodiments. In alternative embodiments, the value in the CreditsRequested field 308 may be based at least on the size of the SMB message to be sent. In still further embodiments, other or additional factors may be considered in requesting credits. Also, large messages may be transferred using RDMA, in embodiments.

The PreferredSendSize field 310 may include the size (possibly in bytes) of the largest SMB Direct Data Transfer packet 338 that the client/requester 102 wishes to be able to transmit to the server/receiver 106. The MaxReceiveSize field 312 includes a size (possibly in bytes) of the largest SMB Direct Data Transfer message that the client/requester 102 will accept from the server/receiver 106. This value may be equal to the block or predetermined allocation of the memory buffer 222a that the client 102 set in embodiments. Thus, no single SMB2 data transfer will exceed the memory allocation. In embodiments, this value is greater than or equal to threshold 128, which is at least the size of the SMB Direct header in the data transfer packet and a small SMB2 message. The MaxSmb2MessageSize field 314 may include a size (possibly in bytes) of the largest SMB2 Protocol message that the client/requester will accept from the server/receiver 106, according to an embodiment. This value is predetermined and set by the client 102. In embodiments, the value in the MaxSmb2MessageSize field 314 may not be greater than the total size of the memory buffer 222a. In this way, no SMB message may overflow the memory buffer 222a. However, the value of the MaxSmb2MessageSize field 314 may be less than the amount of memory in the memory buffer 222a, as determined by a user, according to an embodiment.

Turning to FIG. 3B, an SMB Direct Negotiate Response packet 336 is shown in accordance with embodiments. The SMB Direct Negotiate Response packet 336 may be sent by a peer 106 to complete the negotiation for the RDMA connection. The SMB Direct Negotiate Response packet 336 may include one or more of, but is not limited to, the following fields, for example: MinVersion 302b, MaxVersion 304b, PreferredVersion 318, Reserved 306b, CreditsRequested 308b, CreditsGranted 320a, Status 322, PreferredSendSize 310b, MaxReceiveSize 312b, and/or MaxSMB2MessageSize 314b. The SMB Direct Negotiate Response packet 336 may include additional or fewer fields than those shown in FIG. 3B, as represented by ellipses 324.

According to embodiments, the MinVersion field 302b may include a value for the lowest SMB Direct Protocol version that the server/receiver 106 supports. The MaxVersion field 304b may store the highest SMB Direct Protocol version that the server/receiver 106 supports. This value may be equal to or greater than the value of the MinVersion field 302b. In embodiments, the server/receiver 106 supports all of the protocol versions (inclusive) in the range between the value in the MinVersion field 302b and the value in the MaxVersion field 304b. The PreferredVersion field 318 stores a value for the common SMB Direct Protocol version. The value of the PreferredVersion field 318, in embodiments, is within the range specified by MinVersion field 302a and MaxVersion field 304a of the client's SMB Direct Negotiate Request packet 300. In further embodiments, the value of the PreferredVersion field 318 is between the range specified by MinVersion field 302b and the MaxVersion field 304b of the server's SMB Direct Negotiate Response packet 336. The Reserved field 306b is simply a reserved field for future unknown requirements and is not used by the server, according to embodiments.

The CreditsRequested field 308b, according to embodiments, comprises a value for the number of send credits that the server/receiver 106 is requesting from the client/requester 102. In embodiments, the value in the CreditsRequested field 308b is greater than zero (0) to ensure that the SMB2 data may be sent in a subsequent message. However, the value in the CreditsRequested field 308b may be any number and may be set based on an average usage. In alternative embodiments, the value in the CreditsRequested field 308b is based on the size of the SMB message to be sent or may be based on other factors. Large messages may be sent when one credit is requested, according to embodiments. The CreditsGranted field 320a includes the number of credits granted from the server/receiver 106 to the client/requester 102. In embodiments, the value of the CreditsGranted field 320a is greater than zero (0) to allow the client/requester 102 to send the next SMB Direct message.

In embodiments, a status field 322 includes at least one flag or value. In an embodiment, the status field 322 includes one or two values, either status success or status not supported. The success flag designates that the server/receiver 106 has accepted the client/requester's SMB Direct Negotiate Request packet 300. The not supported flag designates that the server/receiver 106 has rejected the client/requester's 102 SMB Direct Negotiate Request packet 300.

According to embodiments, the PreferredSendSize field 310b may include the size (possibly in bytes) of the largest SMB Direct Data Transfer packet 338 that the server/receiver 106 wishes to be able to transmit to the client/requester 102. The PreferredSendSize field 310b is, in embodiments, smaller than or equal to the MaxReceiveSize field 312a in the SMB Direct Negotiate Request packet 300. Thus, the packet size sent by the server/receiver 106 may not be larger than the memory buffer 222a allotment of the client/requester 102.

In embodiments, the MaxReceiveSize field 312b includes a size (possibly in bytes) of the largest SMB Direct Data Transfer message that the server/receiver 106 will accept from the client/requester 102. This value may be equal to the block or predetermined allocation of the memory buffer 222b that the server/receiver 106 set. Thus, in embodiments, no SMB2 data transfer will exceed the memory allocation. In embodiments, this value is greater than or equal to the threshold 128, which is at least the size of the SMB Direct header in the data transfer packet. The MaxSmb2MessageSize field 314b may include a size (possibly in bytes) of the largest SMB2 Protocol message that the server/receiver 106 will accept from the client/requester 102. This value is predetermined and set by the server/receiver 106. In embodiments, the value in the MaxSmb2MessageSize field 314b may not be greater than the total size of the memory buffer 222b. In this way, no SMB message may overflow the memory buffer 222b. However, the value of the MaxSmb2MessageSize field 314b may be less than the amount of memory in the memory buffer 222b, as determined by a user, according to an embodiment.

An SMB Direct Data Transfer packet 338 is shown in FIG. 3C, in accordance with embodiments disclosed herein. The SMB Direct Data Transfer packet 338 may be sent to transfer SMB2 data across the RDMA connection established during the negotiation. Either the client/requester 102 or the server/receiver 106 may send or receive the SMB2 data. As such, both the client/requester 102 and the server/receiver 106 are referred to generally as the receiver and sender. The SMB Direct Data Transfer packet 338 may include one or more of, but is not limited to, the following fields, for example: CreditsRequested 308c, CreditsGranted 320b, Reserved 306c, RemainingDataLength 326, DataOffset 328, DataLength 330, and/or SMB2 Data 332. The SMB Direct Data Transfer packet 338 may include additional or fewer fields than those shown in FIG. 3C, as represented by ellipses 334, according to embodiments.

In embodiments, the CreditsRequested field 308c comprises a value for the number of send credits that the sender is requesting from the receiver. In embodiments, the value in the CreditsRequested field 308c is greater than zero (0) to ensure that the SMB2 data may be sent in a subsequent message. However, the value in the CreditsRequested field 308c may be any number and may be set based on predicted future usage, i.e., how many more packets are to complete the transfer of the SMB2 data. The CreditsGranted field 320b includes the number of credits granted from the sender to the receiver. In embodiments, the value of the CreditsGranted field 320b can be zero because the peer is not obligated to honor a peer's request for credits. However, the peer can provide credits in the CreditsGranted field 320b to allow the client/requester 102 to send the next SMB Direct message. The Reserved field 306c is simply a reserved field for future unknown requirements and is not used by the client, according to embodiments disclosed herein.

In embodiments, the RemainingDataLength field 326 may include a number of bytes of a fragmented SMB2 message that the receiver has yet to receive. Thus, any value other than zero in this field indicates to the receiver that another SMB Direct Data Transfer packet 338 will be sent with more data. If the SMB Direct Data Transfer packet 338 carries a complete SMB2 message or the last of two or more SMB Direct Data Transfer packets 338 that carry fragmented SMB2 data, then the value in the RemainingDataLength field 326 is zero (0), according to embodiments. RDMA is capable of sending messages sequentially. As such, reassembling messages is simplified because sequential messages are reassembled in strict order of receipt. Thus, the embodiments forgo the need for a message identifier in the header or the use of other more complicated reassembly techniques, for example.

In an embodiment, the DataOffset field 328 includes a value for the offset, in bytes, from the beginning of the SMB Direct Data Transfer packet 338 to the first 8-byte aligned byte of the encapsulated SMB2 Protocol message. In embodiments, if the value of the DataLength field 330 is zero, then the DataOffset field 328 is also set to zero. If the value of DataLength is not zero, then the DataOffset field 328 is some value and may be greater than or equal to 24 bytes, which is the size of the other fields in the header, according to an embodiment. The DataLength field 330 may include the size, in bytes, of the encapsulated SMB2 Protocol message in the SMB2 Data field 332. In embodiments, if the SMB Direct Data Transfer packet 338 does not encapsulate an SMB2 Protocol message, then the value of the DataLength field 330 is set to zero. The SMB2 Data field includes any SMB2 Protocol message, according to embodiments.

Figure 3D:
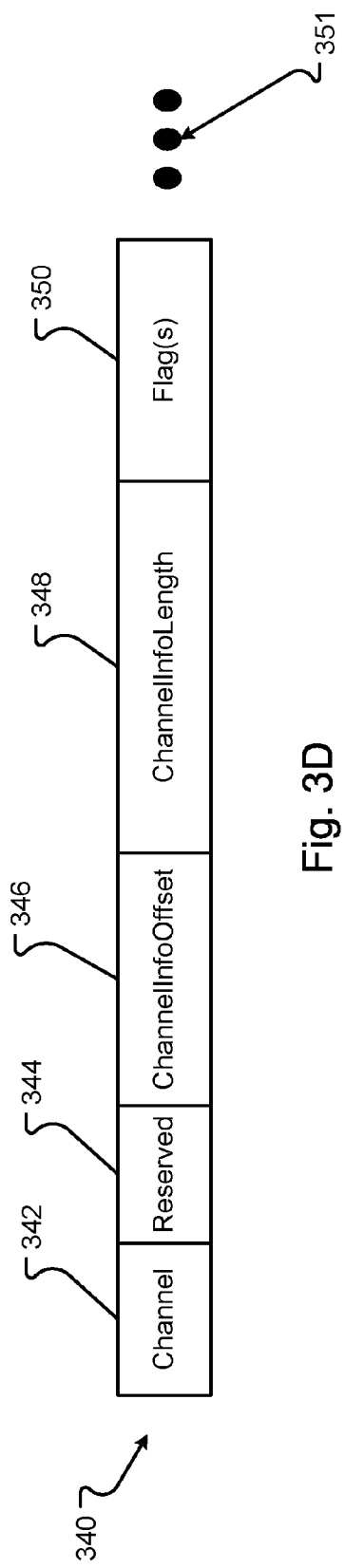

An SMB2 Read/Write Request 340 is shown in FIG. 3D, in accordance with embodiments disclosed herein. The SMB2 Read/Write Request 340 may be encapsulated in the SMB Direct Data Transfer packet 338 to perform a direct RDMA read/write. A direct RDMA read/write sends only unencoded application data. The SMB2 Read/Write Request 340 may be a SMB2 Read Request if the server 106 is to perform an RDMA write to the client 102 and a SMB2 Write Request if the server 106 is to perform an RDMA read from the client 102, according to embodiments of the present disclosure. Regardless, the fields in the SMB2 Read/Write Request 340 are similar. It should be noted that the server 106 performs the RDMA transfer that the client 102 requests. The SMB2 Read/Write Request 340 may include one or more of, but is not limited to, the following fields, for example: Channel 342, ChannelInfoOffset 346, and ChannelInfoLength 348. In an embodiment, the fields may include the steering information for completing the RDMA data transfer. The Reserved field 344 is simply a reserved field for future unknown requirements and is not used, according to an embodiment. The SMB2 Read/Write Request 340 may include additional or fewer fields than those shown in FIG. 3D, as represented by ellipses 351. The fields shown are offered for purposes of illustration and are not intended to be limiting.

In embodiments, the Channel field 342 comprises a value for the channel where the data are to be found. The RDMA connection may include several channels. The channel information may include information that the peer provides to the RDMA device to accomplish the transfer, according to embodiments. For example, the channel information may contain one or more tokens, offsets, and lengths of memory segments, along with other RDMA-specific information, as shown in FIG. 3E.

In an embodiment, the ChannelInfoOffset field 346 and the ChannelInfoLength field 348 are pointers to the offset, token, and length information in the data packet. The pointers give the location in the SMB2 read or write request where the information may be located. In embodiments, the Flags 350 include any information to control or change the behavior of the RDMA direct data transfer.

Figure 3E:
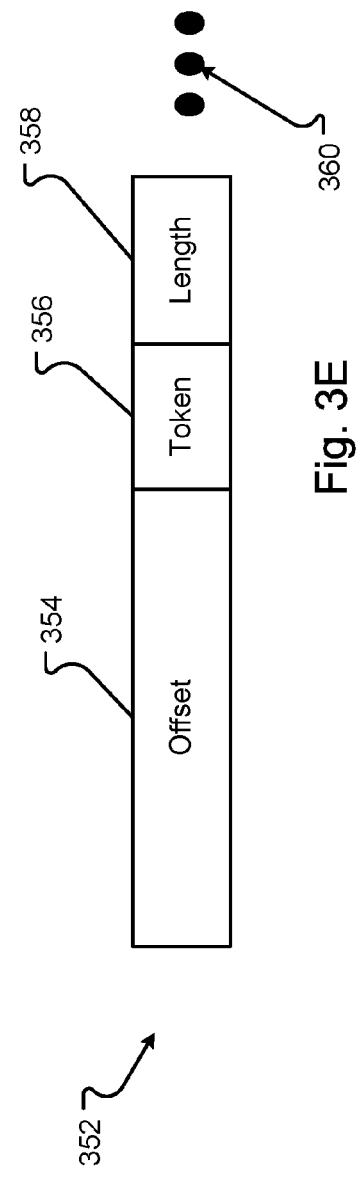

Turning to FIG. 3E, an RDMA channel descriptor 352 is shown, in accordance with embodiments disclosed herein. The RDMA channel descriptor 352 may be encapsulated in the SMB Direct request, typically in the channel field 342. The RDMA channel descriptor 352 may include one or more of, but is not limited to, the following fields, for example: Offset 354, Token 356, and Length 358. In an embodiment, the fields are the steering information for completing the RDMA data transfer. The RDMA channel descriptor 352 may include additional or fewer fields than those shown in FIG. 3E, as represented by ellipses 360. The fields shown are offered for purposes of illustration. To complete a direct data transfer, RDMA is directed to the memory with the data that is to be read or written and the length of the data based on the information in the channel field 342. As the direct data transfer sends only application data, this information helps ensure a proper transfer.

According to an embodiment, the Offset 354 is the value in bytes or bits where the data begins. The Offset 354 may be measured from a memory block starting address, which may be located using information provided in the Token 356. The Length 358 is the value in bits or bytes of how long the data segment is. This steering information guides the direct data transfer, for example.

Figure 4B:
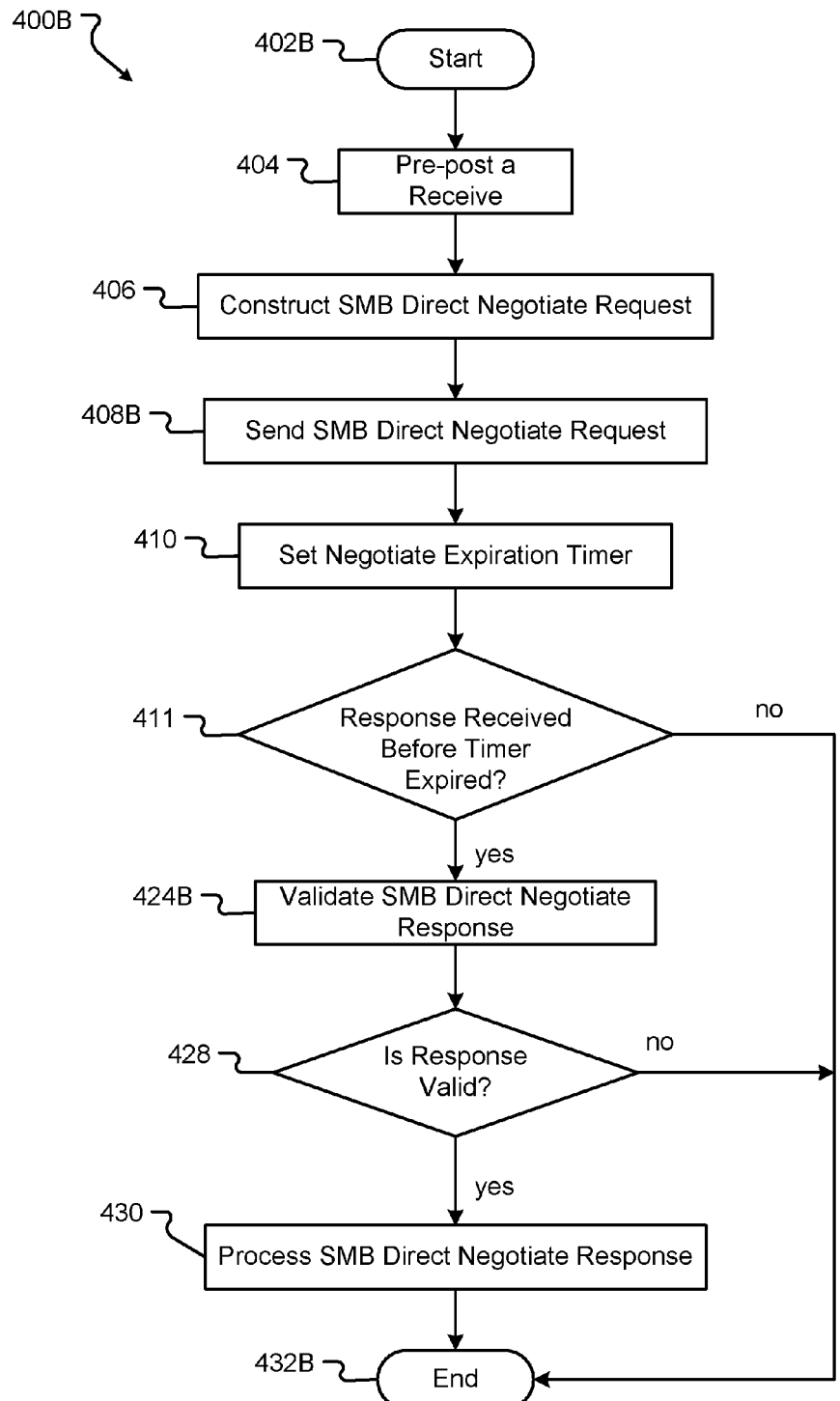
Figure 4C:
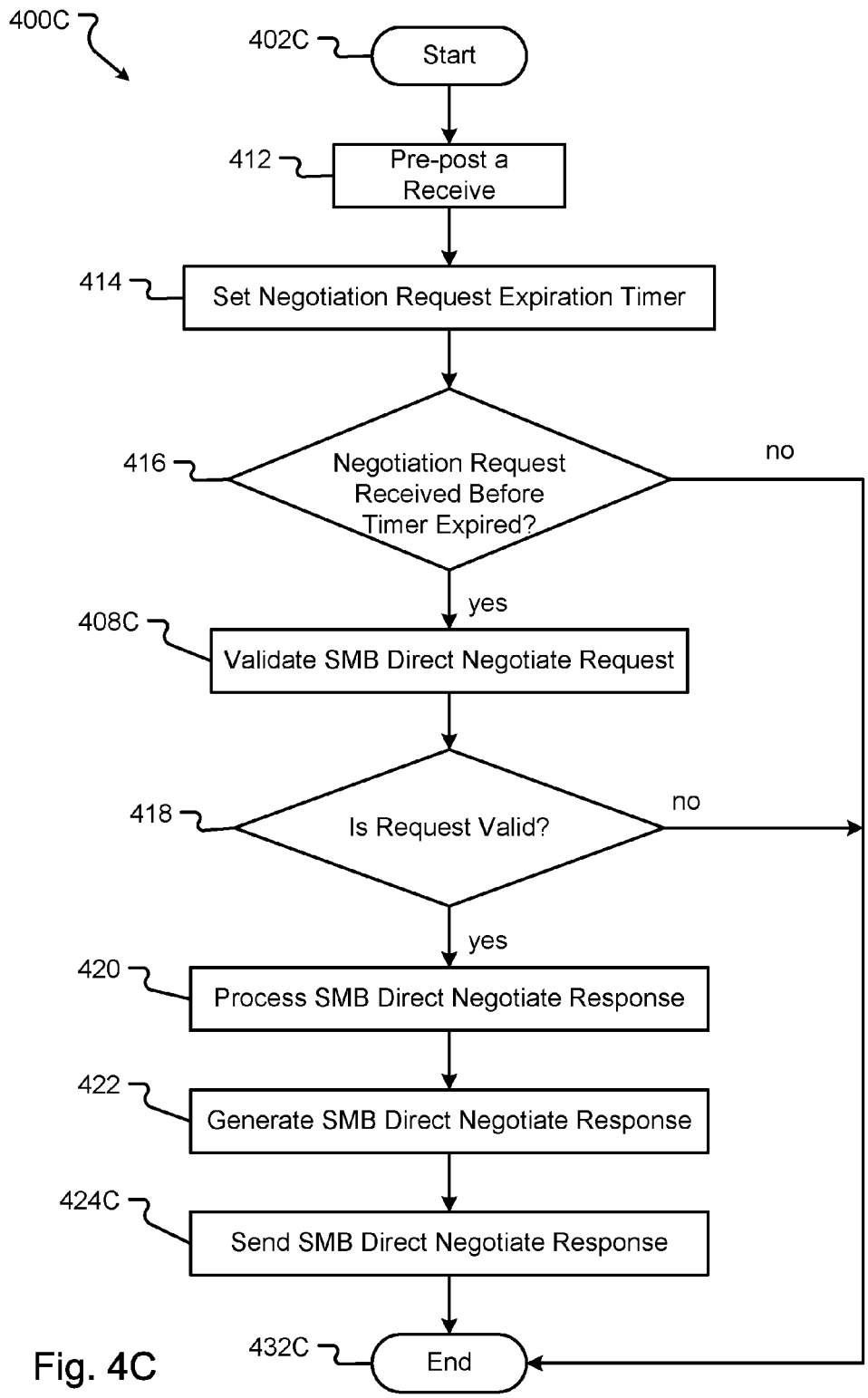

The interactions of the various software functional modules depicted in FIGS. 2A and 2B are further illustrated in the operational steps 400 depicted in FIGS. 4A-4C for negotiating an RDMA connection, in accordance with an embodiment disclosed herein. FIG. 4A shows the representation 400A of the transfers of packets 408 and 424 between a client 102 and a server 106, according to embodiments of the present disclosure. FIG. 4B is in the perspective of the client 102, while FIG. 4C is in the perspective of the server 106, according to embodiments of the present disclosure. It should be noted that the process 400 is described as the client requesting the RDMA connection and the server 106 responding. However, the reverse could be true where the server 106 requests and the client responds, according to embodiments. Further, the method may be conducted between multiple clients and/or between multiple servers, for example.

Turning to FIG. 4B, example operational steps 400B for negotiating a connection using SMB2 over RDMA are shown in accordance with an embodiment. Process 400B is initiated at START operation 402B, and process 400B proceeds to the client pre-posting a receive 404. In embodiments, the RDMA Interface 216a automatically detects and leverages the RNICs 108a/108b to see that they are available and properly configured. Next, in an embodiment, the SMB Direct NPI is exposed by the SMB Direct module 214. The SMB Direct Client 214a may open a handle to the RDMA Adapter to form an RDMA connection for the SMB2 Client 208. In an embodiment, the SMB Direct Client 214a then requests an RDMA Connection through the RDMA Interface 216a. The SMB Direct Client 214a may also create the allocations in the memory buffer 222a and determine what to request for initial send credits and what will be allowed for receive credits. The allocations in the memory buffer 222a may be of a predetermined size, in embodiments. The total amount of memory in the memory buffer 222a may also be determined, according to embodiments.

Returning to FIG. 4B, the SMB Direct Client 214a may then construct 406 the SMB Direct Negotiate Request packet 300 to send to the RDMA Interface 216a. The SMB Direct Negotiate Request packet 300 is as described in FIG. 3A, for example. As such, the SMB Direct Client 214a sets the fields in the SMB Direct Negotiate Request packet 300. Thus, the SMB Direct Client 214a determines the minimum and maximum versions of SMB Direct that the client 102 may support. The SMB Direct Client 214a determines the number of credits to request. The number of credits to request may be based on known future SMB messages that are to be sent, on predicted SMB traffic that may occur in the future, on historical use of SMB, or by some other method, in embodiments. The send size is determined by internal functions and speed considerations. The maximum receive size may be pegged to the size of the memory buffer allotment. Finally, a maximum SMB message size is determined and set (generally, the maximum SMB message size is large enough to allow a peer to send large SMB2 packets but not so large as to use all the memory). This collected information is entered into the SMB Direct Negotiate Request packet 300, according to embodiments of the present disclosure.

Next, the SMB Direct Client 214a sends 408B the SMB Direct Negotiate Request packet 300. In an embodiment, the SMB Direct Client 214a requests the RDMA Interface 216a to send the SMB Direct Negotiate Request packet 300 by a send operation. The RDMA Interface 216a communicates with the RDMA Interface 216b and sends the SMB Direct Negotiate Request packet 300 to the server 106. With the sending of the SMB Direct Negotiate Request packet 300, the SMB Direct Client 214a begins a negotiation request expiration timer 410. The negotiation request expiration timer may have a predetermined value and counts down from the value to zero. The SMB Direct Client 214a then waits for a response to the SMB Direct Negotiate Request packet 300. If it is determined 411 that the negotiation request expiration timer expires before receiving a response to the SMB Direct Negotiate Request packet 300, process 400B proceeds NO to END operation 432B where the connection is dropped.

Turning to FIG. 4C at start operation 402C, the server 106 anticipates the SMB Direct Negotiate Request packet 300 and pre-posts a receive 412, in embodiments. The SMB2 Server 212b may listen for activity and automatically discover that RDMA is available and bound on a port of the RNIC 108b, according to embodiments. SMB2 Server 212b opens a listener endpoint and determines that RDMA is available on the RNIC 108b. Next, SMB2 Server 212b then begins communications with the SMB Direct Server 214b. The SMB Direct Server 214b may open an RDMA connection and receive an RDMA Adapter Handle. The SMB Direct Server 214b then requests an RDMA Connection through the RDMA Interface 216b. The SMB Direct Server 214b may then accept the RDMA Connection, thereby informing the client 102 that the connection request succeeded. This success indication from the RDMA interface 216a triggers the client to send the negotiate request.

The SMB Direct Server 214b may also create the allocations in the memory buffer 222b and determine what to request for initial send credits and what will be allowed for receive credits, according to embodiments. The allocations in the memory buffer 222b may be of a predetermined size. The total amount of memory in the memory buffer 222b may also be determined, according to embodiments of the present disclosure.

Returning to FIG. 4C, the SMB Direct Server 214b may then start a negotiation request expiration timer 414. The negotiation request expiration timer at the server 106 may have a predetermined value and counts down from the value to zero, in embodiments. The SMB Direct Server 214b then waits to receive the SMB Direct Negotiate Request packet 300. While waiting, the SMB Direct Server 214b monitors the RDMA connection and determines 416 if the negotiation request expiration timer expires before receiving the SMB Direct Negotiate Request packet 300. If the negotiation request timer expires, process 400C proceeds NO to END operation 432C where the connection is dropped.

However, if the SMB Direct Negotiate Request packet 300 arrives at the RNIC 108b and the RDMA Interface 216b before the expiration of the negotiation request expiration timer, process 400C proceeds YES to receiving and validating 408C, by the RDMA Interface 216b, the SMB Direct Negotiate Request packet 300 and placing the packet in the memory buffer 222b. Next, the SMB Direct Server 214b is informed of the data and determines if the SMB Direct Negotiate Request packet 300 is valid 418.

In embodiments, to validate the SMB Direct Negotiate Request packet 300, the SMB Direct Server 214b reads the data from the SMB Direct Negotiate Request packet 300 and determines the following, for example: if the value of the MaxVersion field 304 is less than the value of the MinVersion field 302 or if no value in the range is supported; if the value of the CreditsRequested field 308 is zero; if the value of the MaxReceiveSize field 312 is less than a predetermined threshold (e.g., 128 bytes); or, if the value of the MaxSmb2MessageSize field 314 is less than a predetermined threshold. If any of the above are true, then the SMB Direct Negotiate Request packet 300 is not valid, and process 400C proceeds NO to END operation 432C, where SMB Direct Server 214b disconnects. If all of the checks are not true, then process 400C proceeds YES to process SMB Direct Response 420, in which the SMB Direct Negotiate Request packet 300 is sent to the SMB Direct Client 214a by the SMB Direct Server 214b.

In processing the SMB Direct Negotiate Request packet 300, the SMB Direct Server 214b sets the setting ProtocolVersion to equal the maximum protocol version shared by the client 102 and the server 106, in embodiments. The SMB Direct Server 214b also determines how many credits to grant. The number of credits to grant depends, in embodiments, on the available space in the memory buffer 222b or other factors. After making these determinations, the SMB Direct Server 214b generates 422 the SMB Direct Negotiate Response packet 336. In an embodiment, the SMB Direct Server 214b sets the fields in the SMB Direct Negotiate Response packet 336. For example, the PreferredVersion field is set to the value in the setting ProtocolVersion. The CreditsGranted 320*a* is set to the number of credits determined by the SMB Direct Server 214*b*, according to an embodiment. The other fields are filled in a similar fashion to the SMB Direct Negotiate Request packet 300. The SMB Direct Negotiate Response packet 336 is then sent 424C to the client. In embodiments, the SMB Direct Server 214*b* sends the SMB Direct Negotiate Response packet 336 to the RDMA Interface 216*b* to send.

Returning to FIG. 4B, the SMB Direct client 214*a* may, according to embodiments, determine 411 if the response was received before expiration of the negotiate expiration timer. If the response was received before expiration of the timer, process 400B proceeds YES to validate 424B the SMB Direct Negotiate Response packet 336. The RDMA Interface 216*a* receives the message into the memory buffer 222*a*. The SMB Direct Client 214*a* reads the SMB Direct Negotiate Response packet 336 and then validates the message. To validate the SMB Direct Negotiate Response packet 336, the SMB Direct Client 214*a* determines 428 the following, for example: if the Status field 322 is not STATUS SUCCESS; if the PreferredVersion field 318 does not contain a value that is within the range specified by the MinVersion field 302 and MaxVersion field 304 of the client's SMB Direct Negotiate Request packet 300; if the CreditsRequested field 308*b* is zero; if the CreditsGranted field 320*a* is zero; if the PreferredSendSize field 310*b* is greater than the value specified by the MaxReceiveSize field 312 of the client's SMB Direct Negotiate Request packet 330; or if the MaxReceiveSize field 312*b* is less than a predetermined threshold (e.g., 128 bytes), according to embodiments of the present disclosure. If any of the above are true, then the SMB Direct Negotiate Response packet 336 is not valid, and process 400B proceeds NO to END operation 432B, in which the SMB Direct Client 214*a* disconnects. If all of the checks are not true, then process 400B proceeds YES to process SMB Direct Response 430, in which the SMB Direct Negotiate Response packet 336 is processed by the SMB Direct Client 214*a*, according to embodiments disclosed herein.

In processing the SMB Direct Negotiate Response packet 336, the SMB Direct Client 214*a* completes the following, in embodiments, for example: sets the connection's PeerTargetSendCreditsCount setting in the settings 226 equal to the CreditsRequested field 308*b*; sets the connection's SendCreditsCount setting in the SMB Direct connection properties equal to the CreditsGranted field 320*a*; sets the connection's MaxSendSize setting in the settings 226 equal to the MaxReceiveSize field 312*b*; sets the connection's ReceiveSize setting in the settings 226 equal to the PreferredSendSize field 310*b*; sets the connection's MaxOutboundFragmentedMessageSize setting in the settings 226 equal to the MaxReceiveSize field 312*b*; and sets the connection's Idle Connection timer to expire in a predetermined amount of time (e.g., a few hours, a few minutes, etc.) and starts the timer. Once the above steps have been performed, the RDMA connection negotiation has completed, and the client 102 and server 106 may begin exchanging SMB Direct Data Transfer packets. Process 400B then terminates at END operation 432B.

Figure 5B:
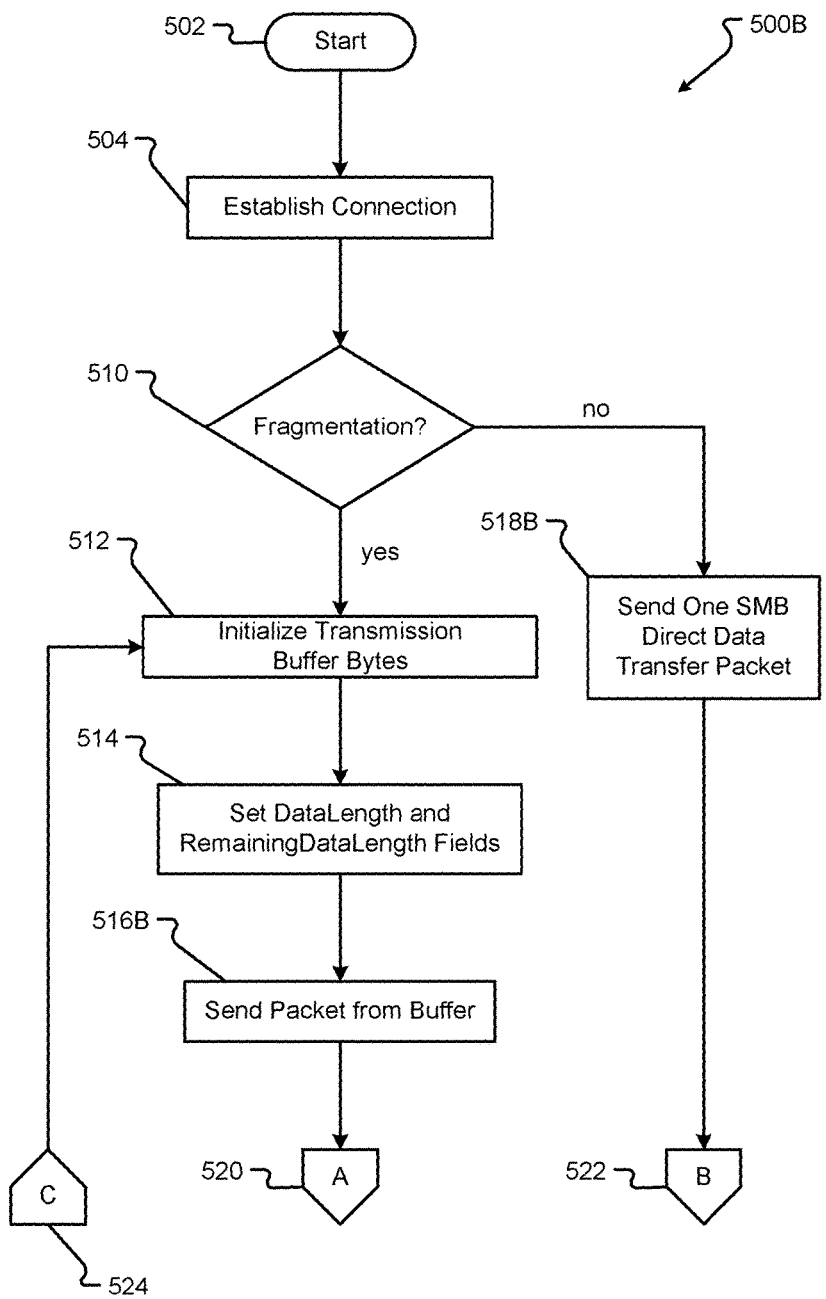
Figure 5C:
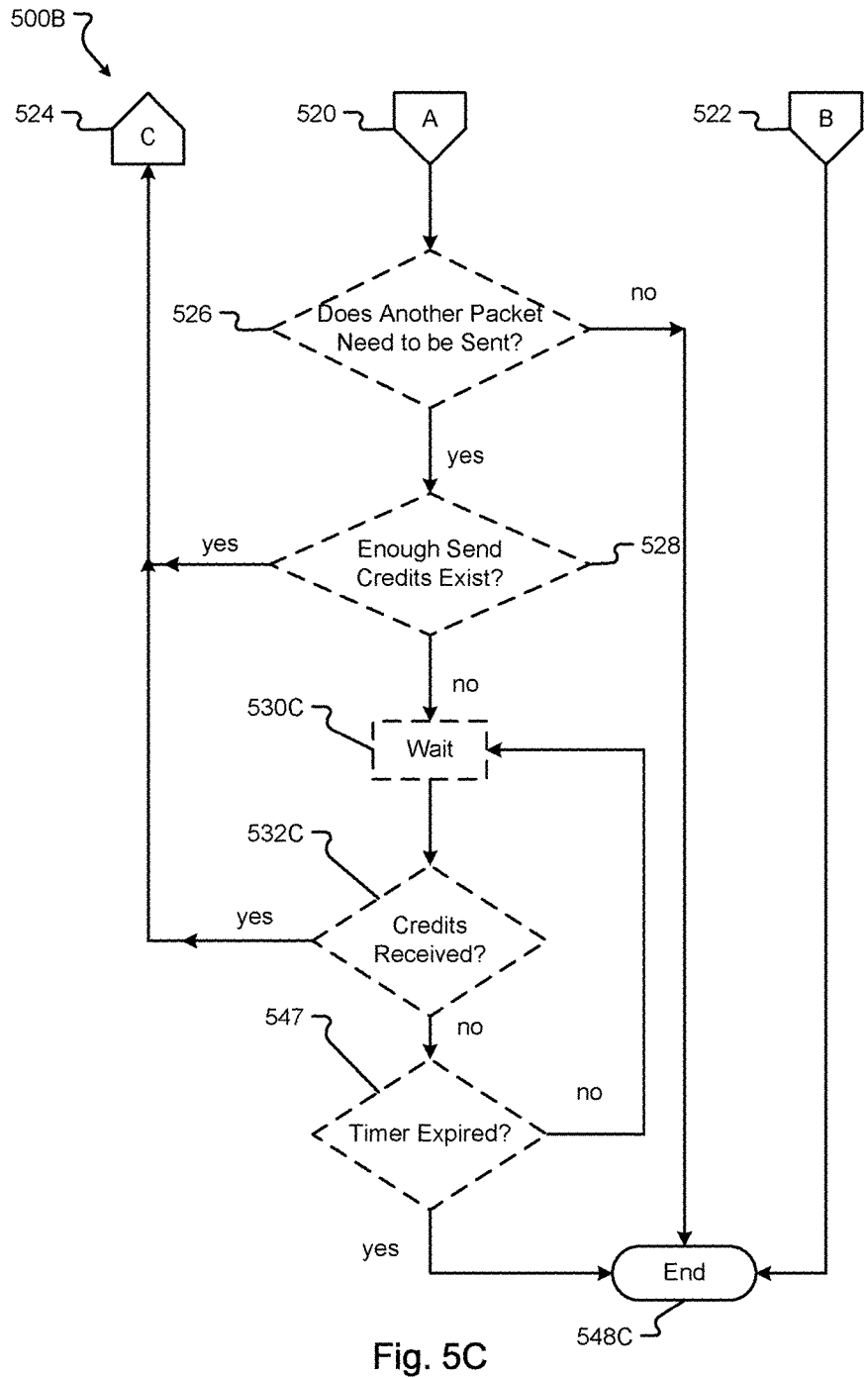
Figure 5D:
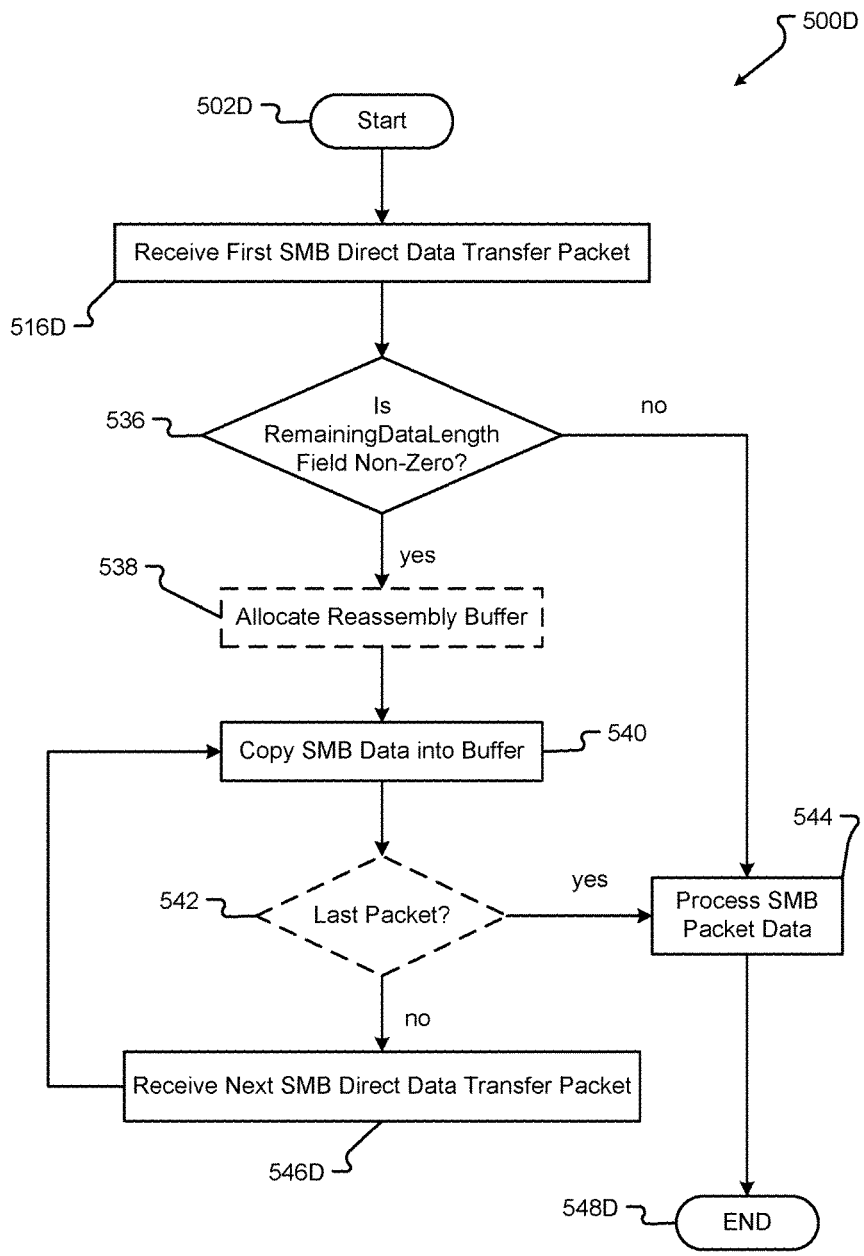

The interactions of the various software functional modules depicted in FIGS. 2A and 2B are further illustrated in the operational steps 500 depicted in FIGS. 5A-5D for exchanging SMB2 data over the established RDMA connection, in accordance with an embodiment disclosed herein. In request and response communications, SMB2 data are transmitted between the client 102 and the server 106 over the established SMB Direct connection by encapsulating the SMB2 data as the data payload of a SMB Direct Data Transfer packet 338, according to embodiments of the present disclosure. Request and response communications may be used for control channel communications, the exchange of file metadata, or for other processes, for example. FIG. 5A shows a representation 500A of the transfer of packets 516/518, 530, 532, and 546 between a client(s) 102 and a server(s) 106, according to embodiments of the present disclosure. FIGS. 5B and 5C are in the perspective of the client 102, while FIG. 5D is in the perspective of the server 106. It should be noted that the process 500 is described as the client sending SMB2 data to the server 106 either independently or in response to a request from the server. However, the reverse could be true where the server 106 responds to a request and sends data back to the client 102. Thus, the processes described herein apply where the server sends requests and requires credits, in embodiments. Further, the method may be conducted between multiple clients or between multiple servers, for example.

Turning to FIG. 5B, example operational steps 500B for exchanging data using SMB2 over RDMA are illustrated in accordance with embodiments disclosed herein. Start operation 502 is initiated, and process 500B proceeds to the client 102 establishing an RDMA connection 504. Establishing an RDMA connection may be as described with respect to FIGS. 4A-4C, according to embodiments of the present disclosure. In an embodiment, the SMB Direct Client 214*a* sets several connection properties including setting the MaxSendSize setting equal to the MaxReceiveSize field 312*b*, setting the connection's ReceiveSize setting equal to the PreferredSendSize field 310*b*, and setting the connection's MaxOutboundFragmentedMessageSize setting in the settings 226 equal to the MaxReceiveSize field 312*b*. In this way, the client 102 has established the size of packets that may be sent to the server 106, according to embodiments.

Returning to FIG. 5B, the SMB Direct Client 214*a* may determine the number of SMB Direct Data Transfer packets that are needed to transport an SMB2 message to the server 106, according to embodiments. To make the determination, the SMB Direct Client 214*a* may first retrieve the MaxSendSize (designated as R) as set during the negotiation. The SMB Direct Client 214*a* may then determine the size of the SMB2 protocol message(s) that is to be sent; this value is set as "S" in embodiments. The SMB Direct Client 214*a* also determines the number of bytes (designated as P, in embodiments) consumed by the SMB Direct Data Transfer packet 338 header and the padding (e.g., the DataOffset 328, etc.) for the SMB Direct Data Transfer packet 338 payload to begin on an 8-byte-aligned boundary. In embodiments, the SMB Direct Client 214*a* then determines if S is less than or equal to (R−P), and, if so, may determine the number of packets by dividing S by (R−P), according to embodiments.

Process 500B then proceeds to determining, by the SMB Direct Client 214*a*, if fragmentation is used 510. In an embodiment, fragmentation is used when the SMB2 protocol message does not "fit" into a single SMB Direct Data Transfer packet 338. In other words, is S greater than (R−P)? If fragmentation is not to be used, process 500B proceeds NO to send one SMB Direct Data Transfer Packet 518B. On the other hand, if fragmentation is used, process 500B proceeds YES to initialize transmission buffer bytes 512.

Returning to step 518, an SMB2 protocol message may be transmitted without fragmentation, according to embodiments. A portion of the memory buffer 222*a*, used for transmitting packets, is initialized. In embodiments, the first P bytes are initialized to set the header information for the SMB Direct Data Transfer packet 338 and to add zeroed padding bytes to ensure that the SMB2 payload is 8-byte aligned. Thus, in the buffer, the DataOffset field 328 is set to P, the DataLength field 330 is set to S, and RemainingDataLength field 326 is set to zero (0), according to embodiments. Information about, or requests for, credits are stored in the CreditsRequested field 308c or the CreditsGranted field 320b. Thus, the client 102 may request or grant more credits in the SMB Direct Data Transfer packet 338. In embodiments, the sender of an SMB Direct Data Transfer packet must set the CreditsRequested field to at least one (1). The next S bytes are initialized in the memory buffer 222a, and the SMB2 protocol message is stored in the SMB2 data field 332. After the SMB Direct Data Transfer packet 338 is assembled, the SMB Direct Client 214a sends 518B the packet to the RDMA Interface 216a to send through the RDMA connection to the server 106. Process 500B then proceeds through page connector B 522 to END operation 548C, and process 500B terminates.

Returning to step 512, where S is greater than (R−P), the SMB2 protocol message is divided into two or more portions, according to embodiments. The portions are then sequenced to be sent in a series of RDMA Send operations, each of which carries a portion (called a fragment) of the SMB2 protocol message. To divide the SMB2 protocol message into fragments, the size of the first payload is set to X, which is equal to or less than (R−P). X represents the number of bytes of the SMB2 protocol message that will be transmitted by at least the first RDMA Send operation, according to an embodiment. As with step 518B, a portion of the memory buffer 222a, used for transmitting packets, is initialized. In embodiments, the first P bytes are initialized to set the header information for the SMB Direct Data Transfer packet 338 plus the padding bytes. Next, the DataOffset field 328 is set to P, the DataLength field 330 is set to X, and the RemainingDataLength field 326 is set to (S−X) 514. The RemainingDataLength field 326 indicates, in embodiments, how many bytes of the SMB2 protocol message remain to be transmitted. In embodiments, when the last fragment of the SMB2 protocol message is transmitted, (S−X) will be zero (0) In the last packet, the RemainingDataLength field 326 is then set to zero, which indicates that the SMB Direct Data Transfer packet 338 carries the last fragment of the SMB2 protocol message. Information about, or requests for, credits are stored in the CreditsRequested field 308c or the CreditsGranted field 320b. Thus, in embodiments, the client 102 requests or grants more credits in the SMB Direct Data Transfer packet 338. The next X bytes of the memory buffer 222a are then initialized. The fragment of the SMB2 protocol message may then be stored in the SMB2 data field 332, according to embodiments disclosed herein.

After assembling the SMB Direct Data Transfer packet 338 with the first untransmitted X bytes of the SMB2 protocol message, the SMB Direct Data Transfer packet 338 is sent 516B to the server. The SMB Direct Client 214a sends 516B the SMB Direct Data Transfer packet 338 to the RDMA Interface 216a to send through the RDMA connection to the server 106, in embodiments. Process 500B then proceeds through page connector A 520 to optional step 526, in which the SMB Direct Client 214a determines 526 if another SMB Direct Data Transfer packet 338 containing another fragment is to be sent. Thus, in embodiments, the SMB Direct Client 214a determines if, after sending the last packet, (S−X) is 0. If (S−X) is 0 or less than zero, meaning the last fragment was sent in the last SMB Direct Data Transfer packet 338, process 500B proceeds NO to END operation 548C, and process 500B terminates. However, if (S−X) is greater than 0, then process 500B proceeds YES to determine if enough send credits exist 528. In embodiments, step 526 may be optional (as shown) because the SMB Direct Data Transfer packets 338 transporting the fragments may be pre-staged in the memory buffer 222a and sent sequentially. When the buffer 222a is empty, process 500B terminates. There is then no need to determine if a next packet is to be sent. It should be noted that when an SMB2 protocol message is fragmented, the RDMA Send operations that carry the fragments are sent sequentially and monotonically, and may not be interrupted by other RDMA Send operations that are unrelated to the fragmented SMB2 protocol message, according to embodiments. The RDMA transport ordering, at the receiver, will preserve the sequencing of the fragments, such that the receiving peer may reconstruct the original message, according to an embodiment.

Returning to step 528, the SMB Direct Client 214a determines 528 if there are enough send credits to send the next fragment. Essentially, the SMB Direct Client 214a determines if there is one send credit left. If there is a send credit, process 500B proceeds YES through page connector C 524 to step 512. In embodiments, RDMA transports have a receive buffer pre-posted by the receiver before the sender may send a packet. This rule requires coordination between the sender and receiver to ensure that senders do not attempt to send a packet before the receiver has pre-posted a receive. SMB Direct uses a system of Send Credits to achieve the desired coordination, according to embodiments of the present disclosure.

In an embodiment, a send credit granted from a server 106 or client 102 represents a single pre-posted receive on the server 106 or client 102. The peer is entitled to perform one RDMA Send operation with one send credit. The client 102 may also provide information to the server 106 about how many send credits the client 102 needs to efficiently support its workload by setting the CreditsRequested field 308c or in the form of a separate Send Credit Request (which is not to be sent in the middle of a set of SMB Direct Data Transfer packets 338 transporting fragmented SMB2 data, according to an embodiment). Send credits are granted in the CreditsGranted field 320b of the SMB Direct Data Transfer packet 338. Thus, the SMB Direct Client 214a may request more send credits by setting the value in the CreditsRequest field 308c to a higher number (possibly covering all the future fragmented packets). The SMB Direct Client 214a may then wait 530C to receive send credits by awaiting a SMB Direct Data Transfer packet 338, sent from the server 106, which has no data but includes send credits in the CreditsGranted field 320b of the SMB Direct Data Transfer packet 338, according to an embodiment. The SMB Direct Client 214a may determine at query 532C if credits are received by setting a SendCreditsGrantedTimer in the timers 224a. If the SendCreditsGrantedTimer expires 547 before credits are granted, process 500B proceeds YES to fail, or terminate, the transmission operation, and process 500B then terminates at END operation 548C. However, if credits are granted 532C, process 500B proceeds YES through page connector C 524 to step 512. According to an embodiment, if no timer is set and/or the timer has not expired 547, process 500B proceeds NO and does not fail, or terminate, the transmission operation but, instead, continues to wait 530C to receive send credits.

Turning to FIG. 5D and start operation 502D for process 500D, at the server 106, the SMB Direct Data Transfer packet 338 is received 516D. In an embodiment, the RDMA Interface 216b receives the SMB Direct Data Transfer packet 338 and sends it to the SMB Direct Server 214b. First, the SMB Direct Server 214b reads the header information. The SMB Direct Server 214b proceeds to query 536 to determine if the RemainingDataLength field 326 is something other than zero. If the RemainingDataLength field 326 is zero, then the SMB Direct Data Transfer packet 338 is the only packet, and process 500D proceeds NO to process SMB packet data 544 where the SMB Direct Server 214b processes the packet data and sends the SMB2 protocol message to SMB2 Server 212b, in an embodiment. If the RemainingDataLength field 326 is something other than zero, process 500D proceeds YES to allocate reassembly buffer 538.

In step 538, the SMB Direct Server 214b allocates a portion of the memory buffer 222b to reassemble the SMB2 protocol message in the buffer 222b, in an embodiment. Thus, the SMB Direct Server 214b may allocate enough blocks in the memory buffer 222b to accept the data in the current SMB Direct Data Transfer packet 338 and in the upcoming SMB Direct Data Transfer packets 338, which is based on the DataLength field 330 value plus the RemainingDataLength field 326 value. The SMB Direct Server 214b may then read the SMB2 data from the SMB2 data field 332 and copy the data into the allocated buffer 540, according to embodiments of the present disclosure.

Next, an embodiment provides for the SMB Direct Server 214b to wait and receive 546D the next SMB Direct Data Transfer packets 338. The data in the SMB2 data field 332 is also copied into the next portion of the memory buffer 222b, in an embodiment. In an alternative embodiment, the SMB Direct Server 214b may optionally determine if this next SMB Direct Data Transfer packet 338 is the last packet containing fragmented data 542. To make the determination, the SMB Direct Server 214b checks if the RemainingDataLength field 326 is zero. If the RemainingDataLength field 326 is zero, the SMB Direct Server 214b understands that no more packets will be received, and process 500D proceeds YES to process the SMB2 protocol message 544 from the memory buffer 222b. Process 500D then terminates at END operation 548D. On the other hand, if the RemainingDataLength field 326 is something other than zero, the SMB Direct Server 214b understands that another packet(s) will be received, and process 500D proceeds NO to receive 546D the next SMB Direct Data Transfer packet 338, according to an embodiment.

Figure 6:
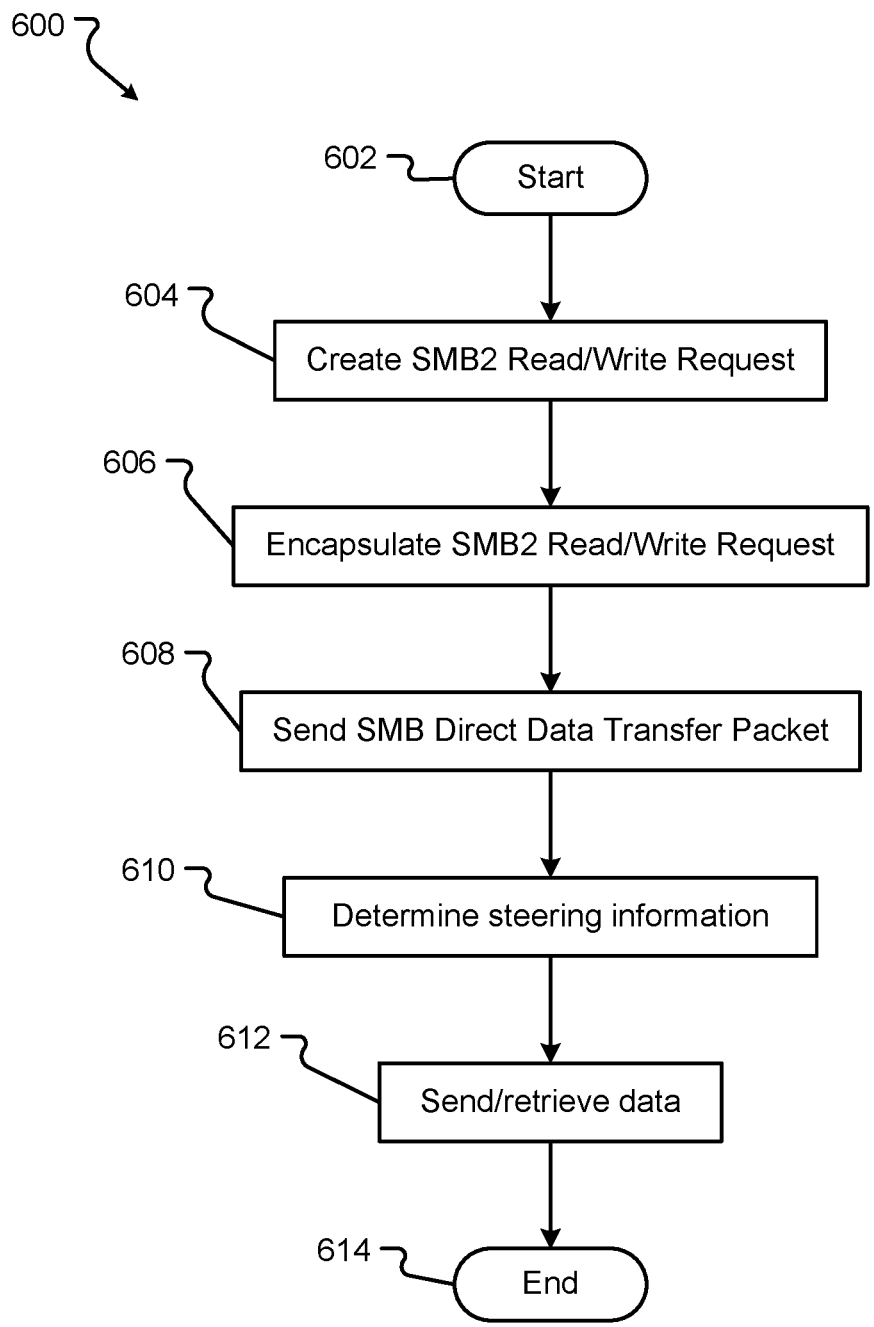
FIG. 6 illustrates a flow diagram depicting the operational characteristics of a process for exchanging data using an RDMA direct data transfer, in accordance with embodiments of the present disclosure.

The interactions of the various software functional modules depicted in FIGS. 2A and 2B are further illustrated in the operational steps 600 depicted in FIG. 6 for performing an RDMA Direct Data Transfer in accordance with an embodiment disclosed herein. FIG. 6 shows the representation of the data transfer between a client 102 and a server 106, according to embodiments of the present disclosure.

As shown in FIG. 6, process 600 is initiated at start operation 602, and the SMB2 Client 208 creates 604 an SMB2 read/write request 340. An application 220 can request data to be transferred to the server 106 or read from the server 106. The data transfer may be directed by the SMB2 Client 208 to employ an RDMA direct data transfer, such that the SMB2 server 106 uniquely performs the actual RDMA request, in accordance with embodiments of the present disclosure. To begin the transfer, the SMB2 Client 208 registers the target memory buffers to provide or receive unencoded application data, and then generates an SMB read/write command that is to be sent and conducted over RDMA. The command may be included in the SMB2 read/write request 340 and sent to the SMB Direct Client 214a, which encapsulates 606 the SMB2 read/write request 340 in a SMB Direct Data Transfer packet. In embodiments, the SMB2 read/write request 340 is stored in the SMB2 Data field 332 in the SMB Direct Data Transfer packet. The SMB Direct Data Transfer packet may then be sent 608 over the RDMA interface 216 to the server 106. In an embodiment, the server 106 receives the SMB Direct Data Transfer packet and reads the SMB2 read/write request 340 from the SMB2 Data field 332. The SMB Direct Server 214b may then read the data from the SMB2 read/write request 340, including the channel 342, ChannelInfoOffset 346, and the ChannelInfoLength 348. This information may direct the SMB Direct Server 214b to the steering information 610 in the RDMA Channel Descriptor 352. From the steering information, the SMB Direct Server 214b may start the direct data transfer by sending or retrieving 612 unencoded application data to or from a memory location in a buffer of the client 102. Process 600 then terminates at END operation 614.

FIGS. 4A-4C, 5A-5D, and 6 illustrate example operational characteristics for negotiating a communication using a file access protocol over RDMA and exchanging data using a file access protocol over RDMA, respectively, in accordance with embodiments disclosed herein. In embodiments, operational steps depicted may be combined into other steps and/or rearranged. Further, fewer or additional steps may be used, for example.

In general, credits are an advantage to the present embodiments. A send credit represents a buffer that has been pre-posted to receive incoming data on a peer. As such, a send credit represents limited receiver resources (memory, memory regions, etc.) that have been committed to the peer so that the peer may use them to transmit data. Due to the nature of RDMA, a receive, once-posted, may not be canceled, in embodiments. For the resources that are associated with the receive to be released, the resources are used to service an incoming send. This poses a possible problem in embodiments if the receiving peer starts to run low on resources and wants to reclaim some of the resources it has dedicated to outstanding receives. Since receives may not be cancelled according to embodiments disclosed herein, reclaiming these resources relies on the cooperation of the peer.

A solution to this issue in SMB Direct is referred to as the Send Credit Revocation, according to an embodiment. An SMB Direct Data Transfer packet that is transmitted to the peer has a CreditsGranted field that specifies how many additional send credits have been granted to the peer. In alternative embodiments, by setting a CreditRevocation flag (not shown) in the SMB Direct Data Transfer packet 338, the meaning of the CreditsGranted field 320b changes to be the number of Send Credits that the peer may keep. For example, if the CreditRevocation flag were set and the value of CreditsGranted field 320b is ten (10) then ten (10) is the number of credits the receiver may retain. If the receiver currently holds more than ten (10) Send Credits, then the receiver performs a series of RDMA Send operations to use up the revoked Send Credits so that the receiver ends up with ten (10) or fewer Send Credits. The send operations that are performed to use up revoked Send Credits may include sending an empty SMB Direct Data Transfer packet 338 (a packet with no data payload). Upon receiving the incoming empty SMB Direct Data Transfer packets 338, the peer that revoked the Send Credits may release these resources or reuse them as it sees fit, according to embodiments.

While Send Credits allow two peers to synchronize their Send and Receive operations, the peers, in embodiments, attempt to avoid send credit deadlocks. Imagine a scenario in which Peer Y has a single Send Credit from peer X and where peer X has a single Send Credit from peer Y. In this scenario, each peer is entitled to perform a single send to its peer at any time. Imagine that both X and Y simultaneously perform a Send operation, using their single Send Credit in the process, but the SMB Direct Data Transfer packet 338 that is transmitted by both peers grants no additional Send Credits to the peer. The resulting state is known as a Send Credit deadlock. Both X and Y have used their last Send Credit. To be able to send additional packets to the peer, each peer needs additional Send Credits. However, Send Credits are granted via SMB Direct Data Transfer packets 338, and neither peer may perform any further send operations. The result is that neither peer may transmit any additional packets, and there is no mechanism by which they may acquire further send credits. A deadlock has therefore occurred.

A solution to this issue is simply a rule, according to embodiments of the present disclosure. When an SMB Direct peer uses its last Send Credit, the SMB Direct Data Transfer packet 338 that is being sent grants at least one (1) additional send credit to the peer, according to an embodiment. If both peers follow this rule, the deadlock does not occur because each peer will always be able to respond to the other with a grant of additional Send Credits.

Finally, FIG. 7 illustrates an example computing system 700 upon which embodiments disclosed herein may be implemented. A computer system 700, such as client/application server 102 or file server 106, for example, which has at least one processor 702 for exchanging message data as shown herein, is depicted in accordance with embodiments disclosed herein. The system 700 has a memory 704 comprising, for example, system memory, volatile memory, and nonvolatile memory. In its most basic configuration, computing system 700 is illustrated in FIG. 7 by dashed line 706. Additionally, system 700 may also include additional storage (removable and/or non-removable) including, but not limited to, magnetic or optical disks or tape. Such additional storage is illustrated in FIG. 7 by removable storage 708 and non-removable storage 710.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 708, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store information and which may be accessed by computing system 700. Any such computer storage media may be part of system 700. The illustration in FIG. 7 is intended in no way to limit the scope of the present disclosure.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

System 700 may also contain communications connection(s) 716 that allow the device to communicate with other devices. Additionally, system 700 may have input device(s) 714 such as a keyboard, mouse, pen, voice input device, touch input device, etc. Output device(s) 712 such as a display, speakers, printer, etc. may also be included. All of these devices are well known in the art and need not be discussed at length here. The aforementioned devices are examples and others may be used.

Having described embodiments of the present disclosure with reference to the figures above, it should be appreciated that numerous modifications may be made to the embodiments that will readily suggest themselves to those skilled in the art and which are encompassed within the scope and spirit of the present disclosure and as defined in the appended claims. Indeed, while embodiments have been described for purposes of this disclosure, various changes and modifications may be made which are well within the scope of the present disclosure.

Similarly, although this disclosure has used language specific to structural features, methodological acts, and computer-readable media containing such acts, it is to be understood that the subject matter defined in the appended claims is not necessarily limited to the specific structure, acts, features, or media described herein. For example, while specific names or naming conventions have been used in describing aspects of the embodiments, such as names for APIs, routines, etc., numerous modifications may be made to such names and/or naming conventions which are encompassed within the spirit and scope of the present disclosure. The specific structures, features, acts, names, naming conventions, and/or media described above are disclosed as example forms of implementing the claims. Aspects of embodiments allow for multiple client/application servers, multiple file servers, multiple networks, multiple connection peers, etc. Or, in other embodiments, a single client computer with a single server and a single network are used. One skilled in the art will recognize other embodiments or improvements that are within the scope and spirit of the present disclosure. Therefore, the specific structure, acts, or media are disclosed as example embodiments of implementing the present disclosure. The disclosure is defined by the appended claims.

What is claimed is:

1. A computer-implemented method for establishing a connection for exchanging data, the method comprising:
   receiving, by a receiver, a first packet, wherein the packet comprises a first field and data, wherein the first field is equal to a number of bytes of a fragmented message that the receiver has yet to receive;
   determining if a value stored the first field zero;
   when the value is zero:
      processing the data in the first packet;
   when the value is not zero:
      allocating a reassembly buffer to the connection;
      copying the data from the first packet into the reassembly buffer;
      receiving a second packet comprising second data; and
      copying the second data from the second packet into the reassembly buffer.

2. The computer-implemented method of claim 1, wherein the first packet comprises one or more fields from the group consisting of:
   a credits requested field;
   a credits granted field;
   a data offset field; and
   a data length field.

3. The computer-implemented method of claim 2, wherein the credits granted field delineates how many credits were provided to a sender of the first packet.

4. The computer-implemented method of claim 1, wherein a credit is a value identifying the number of messages that may be sent by the sender.

5. The computer-implemented method of claim 1, further comprising:
   determining if the second packet is a last packet;
   if the second packet is the last packet, processing data in the reassembly buffer;
   if the second packet is not the last packet, receiving at least a third packet and copying third data from the third packet into the reassembly buffer.

6. The computer-implemented method of claim 5, wherein the reassembly buffer includes data from at least two data packets.

7. The computer-implemented method of claim 5, wherein the determining if the first packet is a last packet comprises determining if the value stored in the first field equals zero.

8. The computer-implemented method of claim 1, further comprising:
   pre-posting a receive of a negotiation request;
   setting a negotiation request expiration timer;
   determining if the negotiation request was received before the negotiation request expiration timer expired;
   if the negotiation request was not received before the negotiation request expiration timer expired, cancelling the receive of the negotiation request;
   if the negotiation request was received before the negotiation request expiration timer expired, receiving the negotiation request, wherein the negotiation request requests to establish the connection to send data using remote direct memory access;
   validating the negotiation request;
   processing the negotiation request;
   in response to processing the negotiation request, generating a response, wherein the response allows the connection and assigns at least one credit to a sender of the negotiation request to send a packet;
   sending the response.

9. The computer-implemented method of claim 8, wherein the negotiation request comprises one or more fields from the group consisting of:
   a request version field;
   a first credit request field;
   a preferred size field indicating a first size; and
   a max size field indicated a second size.

10. The computer-implemented method of claim 9, wherein the response comprises one or more fields from the group consisting of:
    a response version field;
    a preferred version field;
    a second credit request field;
    a credit granted field; and
    a status field.

11. A computer storage device storing computer-executable instructions that when executed by a processor perform a method for exchanging data, the method comprising:
    establishing a connection with a server;
    negotiating a connection with the server, wherein the negotiation establishes a maximum number of bytes the server will receive in the connection;
    determining a number of packets to send data associated with the connection to the server;
    determining if fragmentation of the data is to be used;
    when fragmentation of the data is not to be used:
       sending a first packet to the server with the data;
    when fragmentation of the data is to be used:
       initializing first bytes within a transmission buffer to send as data in the first packet;
       setting a first field corresponding to data length and a second field corresponding to remaining data in the first packet, wherein the second field is equal to a number of bytes of a fragmented message that the server has yet to receive;
       sending the first packet to the server;
       initializing bytes within the transmission buffer to send as data in the second protocol packet;
       setting a third field corresponding to remaining data in the second packet; and
       sending the second packet to the server.

12. The computer storage device of claim 11, wherein the determining if fragmentation is to be used comprises determining if the number of packets needed to send the data is greater than one.

13. The computer storage device of claim 12, wherein determining a number of packets to send comprises determining if a maximum number of bytes the server can receive in the connection is less than a number of bytes of data to be sent.

14. The computer storage device of claim 11, wherein negotiating the connection with the server comprises:
    pre-posting a receive;
    constructing a negotiation request;
    sending the negotiation request to the server;
    setting a negotiation expiration timer;
    determining if a response to the negotiation request is received before the negotiation expiration timer expires;
    if a response to the negotiation request is not received before the negotiate expiration timer expires, resending the negotiation request;
    if a response to the negotiation request is received before the negotiation expiration timer expires, receiving a negotiation response;
    validating the negotiation response; and
    processing the negotiation response, wherein the negotiation response provides at least one credit to send the protocol packet.

15. The computer storage device of claim 14, further comprising:
    if enough credits exist for sending the second packet, sending the second packet;
    if enough credits do not exist to send the second packet, requesting at least one more credit from the server;
    determining if enough credits are received;
    if enough credits are not received, terminating the connection; and
    if enough credits are received, sending the second packet.

16. A system configured to establish a connection for exchanging data, the system comprising:
    at least one processor; and
    memory storing computer executable instructions that, when executed by the at least one processor, cause the processor to:

receive, by a receiver, a first packet, wherein the packet comprises a first field and data, wherein the first field is equal to a number of bytes of a fragmented message that the receiver has yet to receive;
determine if a value stored by the first field is zero;
when the value stored by the first field is zero:
  process the data in the first packet;
when the value stored by the first field is not zero:
  allocate a reassembly buffer to the connection;
  copy the data from the first packet into the reassembly buffer;
  receive a second packet comprising second data; and
  copy the second data from the second packet into the reassembly buffer.

17. The system of claim 16, further comprising computer executable instructions stored in the memory that, when executed by the at least one processor, cause the processor to:
  determine if the second packet is a last packet;
  if the second packet is the last packet, process data in the reassembly buffer; and
  if the second packet is not the last packet, receive at least a third packet and copying third data from the third packet into the reassembly buffer.

18. The system of claim 17, wherein the reassembly buffer includes data from at least two data packets.

19. The system of claim 16, further comprising computer executable instructions stored in the memory that, when executed by the at least one processor, cause the processor to:
  pre-post a receive of a negotiation request;
  set a negotiation request expiration timer;
  determine if the negotiation request was received before the negotiation request expiration timer expired;
  if the negotiation request was not received before the negotiation request expiration timer expired, cancel the receive of the negotiation request;
  if the negotiation request was received before the negotiation request expiration timer expired, receive the negotiation request, wherein the negotiation request requests to establish the connection to send data using remote direct memory access;
  validate the negotiation request;
  process the negotiation request;
  in response to processing the negotiation request, generate a response, wherein the response allows the connection and assigns at least one credit to a sender of the negotiation request to send a packet; and
  send the response.

20. The system of claim 16, wherein the first packet comprises one or more fields from the group consisting of:
  a credits requested field;
  a credits granted field;
  a data offset field; and
  a data length field.

* * * * *